(12) United States Patent
Ahn

(10) Patent No.: US 9,077,859 B2
(45) Date of Patent: Jul. 7, 2015

(54) DEVICE FOR RECORDING AND PLAYING CONTENTS, SERVER FOR MANAGING CONTENT LOCATION INFORMATION, INFORMATION RECORDING MEDIUM, METHOD FOR MANAGING CONTENT INFORMATION

(75) Inventor: Kyu Tae Ahn, Seongnam-Si (KR)

(73) Assignee: LG Electronics Inc., Seoul (KR)

( * ) Notice: Subject to any disclaimer, the term of this patent is extended or adjusted under 35 U.S.C. 154(b) by 767 days.

(21) Appl. No.: 12/422,589

(22) Filed: Apr. 13, 2009

(65) Prior Publication Data

US 2009/0257729 A1 Oct. 15, 2009

(30) Foreign Application Priority Data

Apr. 11, 2008 (KR) ........................ 10-2008-0033602

(51) Int. Cl.
| | |
|---|---|
| *H04N 5/93* | (2006.01) |
| *H04N 7/173* | (2011.01) |
| *H04N 5/765* | (2006.01) |
| *H04N 21/2747* | (2011.01) |
| *H04N 21/4788* | (2011.01) |
| *H04N 21/63* | (2011.01) |
| *H04N 9/82* | (2006.01) |

(52) U.S. Cl.
CPC ........... *H04N 7/17318* (2013.01); *H04N 5/765* (2013.01); *H04N 21/2747* (2013.01); *H04N 21/4788* (2013.01); *H04N 21/632* (2013.01); *H04N 9/8205* (2013.01)

(58) Field of Classification Search
CPC . H04N 5/765; H04N 21/632; H04N 21/4788; H04N 21/2747

USPC ..................... 386/291, 231, 235, 353; 725/87
See application file for complete search history.

(56) References Cited

U.S. PATENT DOCUMENTS

| | | | |
|---|---|---|---|
| 2002/0162109 A1 | 10/2002 | Shteyn | |
| 2002/0184457 A1* | 12/2002 | Yuasa et al. | 711/161 |
| 2003/0093790 A1 | 5/2003 | Logan et al. | |
| 2003/0106064 A1* | 6/2003 | Plourde, Jr. | 725/91 |

(Continued)

FOREIGN PATENT DOCUMENTS

| | | |
|---|---|---|
| CN | 1591648 A | 3/2005 |
| EP | 0168680 A1 | 1/1986 |

(Continued)

OTHER PUBLICATIONS

"OpenCable Application Platform (OCAP) Specifications, OCAP Home Networking Extensions", OC-SP-OCAP-HNEXT-I02-071220, Dec. 20, 2007.*

*Primary Examiner* — Syed Zaidi
(74) *Attorney, Agent, or Firm* — Birch, Stewart, Kolasch & Birch, LLP

(57) ABSTRACT

A device for recording and playing contents, a sever for managing content location information, an information recording medium, a method for managing content information, and a recording medium for the method are disclosed. The recording/playing device includes a communication interface unit configured to interface data transmission and reception with at least one external resource connected to a network and a controller configured to receive a request for a content, search for an external resource recording the requested content based on content identification information and control receiving the content from the searched external resource.

17 Claims, 14 Drawing Sheets

(56) References Cited

U.S. PATENT DOCUMENTS

| | | | |
|---|---|---|---|
| 2003/0204602 A1* | 10/2003 | Hudson et al. | 709/228 |
| 2003/0229900 A1* | 12/2003 | Reisman | 725/87 |
| 2004/0025180 A1 | 2/2004 | Begeja et al. | |
| 2004/0088739 A1* | 5/2004 | Shimoji et al. | 725/135 |
| 2005/0010596 A1 | 1/2005 | Yoneyama | |
| 2006/0259930 A1 | 11/2006 | Rothschild | |
| 2007/0027957 A1 | 2/2007 | Peters et al. | |
| 2007/0133938 A1* | 6/2007 | Park | 386/46 |
| 2007/0162947 A1* | 7/2007 | Bertin | 725/134 |
| 2007/0274691 A1 | 11/2007 | Chiba | |
| 2008/0285945 A1* | 11/2008 | Rajakarunanayake et al. | 386/92 |
| 2009/0031390 A1* | 1/2009 | Rajakarunanayake et al. | 725/142 |

FOREIGN PATENT DOCUMENTS

| | | |
|---|---|---|
| EP | 1698142 A1 | 9/2006 |
| JP | 2007-265556 A | 10/2007 |
| KR | 10-2006-0006950 A | 1/2008 |
| WO | WO 2004/098173 A1 | 11/2004 |

\* cited by examiner

| Preamble/SFD | Destination Address | Source Address | Data Length | Data | Checksum |
|---|---|---|---|---|---|
| 7+1bytes | 6bytes | 6bytes | 2bytes | 45~1500bytes | 4bytes |

DEVICE FOR RECORDING AND PLAYING CONTENTS, SERVER FOR MANAGING CONTENT LOCATION INFORMATION, INFORMATION RECORDING MEDIUM, METHOD FOR MANAGING CONTENT INFORMATION

This application claims the benefit of Korean Patent Application No. 10-2008-0033602, filed on Apr. 11, 2008, which is hereby incorporated by reference as if fully set forth herein.

BACKGROUND OF THE INVENTION

1. Field of the Invention

The present invention relates to a recording/playing device, a server for managing content location information, an information recording medium, and a method for managing content information, and more particularly, to a recording/playing device for receiving contents, recording the contents on a recording medium, and playing the contents from the recording medium, a server for managing content location information, an information recording medium, and a method for managing content information.

2. Discussion of the Related Art

Broadcasting waves from a broadcasting station includes a variety of contents including audio, video, application programs, etc. Data broadcasting standards have been developed and are under deployment to receive such broadcast waves and implement application programs in synchronization with audio and video. These data broadcasting standards allow for implementation of various additional functions when transmitted application programs are received, loaded to a terminal, and executed, rather than simply output audio and video.

For example, a Set-Top Box (STB) is a terminal supporting the data broadcasting standards. For the STB, a Java virtual machine is ported to a device driver and Java-based data broadcasting middleware is implemented to support a standard Application Programming Interface (API) using the Java virtual machine. The Java API provided by the data broadcasting middleware of the STB facilitates a Multiple System Operator (MSO) to create an application program that services a Digital Video Recorder (DVR), an Electronic Program Guide (EPG), or the like. When the application program is delivered in broadcasting streams, it is implemented on the data broadcasting middleware of the STB.

Among the data broadcasting standards, Globally Executable Multimedia home platform (GEM) is a standard describing the most common contents, and Open Cable Application Platform (OCAP) is an extension of the GEM standard for a cable broadcasting environment, usually laid out in North America. These two standards have their respective extensions for supporting DVR, called 'DVB; Digital Recoding Extension to GEM' and 'OCAP Extension: OCAP Digital Video Recorder'.

DVR is a function that allows for recording and play-back of a current broadcasting program or rewind or pause of a live broadcasting program. The implementation of the DVR function requires the middleware of the STB to support the DVR extension API of each standard and also requires MSOs to provide DVR API-based applications.

In addition, to use the DVR function, a broadcasting receiver should be equipped with a recording medium, for example, a Hard Disk Drive (HDD). The broadcasting receiver may then record or play received broadcast contents on or from the HDD and may provide time shift, instant replay, various trick plays, etc. The time shift is also referred to as a time machine.

However, the use of an expensive HDD in a broadcasting receiver may increase the manufacture cost of the broadcasting receiver. Due to a limited interior space of the broadcasting receiver product, there may be insufficient room for installing the HDD within the broadcasting receiver. Moreover, the HDD may be an obstacle to making the broadcasting receiver slim.

SUMMARY OF THE INVENTION

Accordingly, the present invention is directed to a device for recording and playing contents, a sever for managing content location information, an information recording medium, a method for managing content information, and a recording medium for the method that substantially obviate one or more problems due to limitations and disadvantages of the related art.

An object of the present invention is to provide a recording/playing device for recording contents on recording media distributed across a network and sharing contents recorded on the recording media, an information recording medium, a server for managing content location information, and a method for managing content location information.

Another object of the present invention is to provide a recording/playing device for acquiring information about contents recorded on recording media distributed across a network, searching the acquired information for information about user-requested contents, and providing the requested contents to the user, an information recording medium, a server for managing content location information, and a method for managing content location information.

Another object of the present invention is to provide a recording/playing device for readily acquiring information about contents recorded on recording media distributed across a network so as to maintain the latest information about the contents, an information recording medium, a server for managing content location information, and a method for managing content location information.

Another object of the present invention is to provide a recording/playing device for, when only part of entire contents are recorded on each of recording media distributed across a network, searching for the recorded part in each recording medium, receiving the content parts from the recording media, combining the received contents into the entire contents, and playing the entire contents, an information recording medium, a server for managing content location information, and a method for managing content location information.

Another object of the present invention is to provide a recording/playing device for efficiently performing a time shift based on contents recorded on recording media distributed across a network, an information recording medium, a server for managing content location information, and a method for managing content location information.

A further object of the present invention is to provide a computer-readable recording medium having a program for executing a content information management method in a computer recorded therein.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording/playing device includes a communication interface unit configured to interface data transmission and reception with at least one external resource connected to a network and a controller configured to receive a request for a content, search for an external resource recording the requested content based on content identification information and control receiving the content from the searched external resource.

In another aspect of the present invention, a content locater management server includes a communication interface unit configured to interface data transmission and reception with at least one recording/playing device connected to a network, a storage configured to store a content list including location information about the recording/playing device and content information being information about contents recorded at the recording/playing device and a controller configured to update the content list upon receipt of the location information or the content information from the recording/playing devices, and search the content list for a recording/playing device recording requested content, upon receipt of a content search request from the recording/playing device.

In another aspect of the present invention, a recording medium includes a first region configured to store location information about an external resource, and a second region configured to store content information in conjunction with the location information, the content information being information about contents recorded by the external resource.

In a further aspect of the present invention, a method for managing content information includes transmitting a message indicating an active state, when the active state is set, transmitting location information that provides access information, upon receipt of a request for the location information in response to the transmitted message, and transmitting content information including content information about recorded contents, upon receipt of a request for the content information in response to the transmitted location information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

According to the present invention, contents may be a broadcasting program or a video file received over a terrestrial, satellite, or cable broadcasting network or over a communication network such as the Internet. Also, the contents may be data carrying program guide information, a program execution file, stock information, or the like.

According to the present invention, a recording/playing device may be a Digital Video Recorder (DVR)-enabled broadcasting receiver.

An external recording medium for recording broadcast contents upon receipt of a time shift request or a recording request resides in a digital device connected to a broadcasting receiver over a wired/wireless network. For example, the external recording medium may be a recording medium within an external resource.

An exemplary embodiment of the present invention is implemented by recording broadcast contents on a recording medium of an external resource, when the broadcast contents are recorded upon request of a time shift. To execute DVR functions such as instant recording, reserved recording, and playback, the broadcasting receiver may utilize recording media of external resources. That is, the broadcasting receiver may record broadcast contents using the external recording media. Herein, recording refers to performing one of instant recording, reserved recording, and time shifting.

The external resources may be digital devices each being equipped with a recording medium such as an HDD and having a network function. The digital devices refer to networking-enabled devices having a digital circuit for processing digital data, which may be at least one of telephones, facsimiles, laptop computers, PCs, printers, scanners, cameras, copiers, hand-held phones, projectors, electronic cookers, and refrigerators. The digital devices may further include devices that are not described in exemplary embodiments of the present invention and may include a plurality of devices of the same type.

Figure 1:
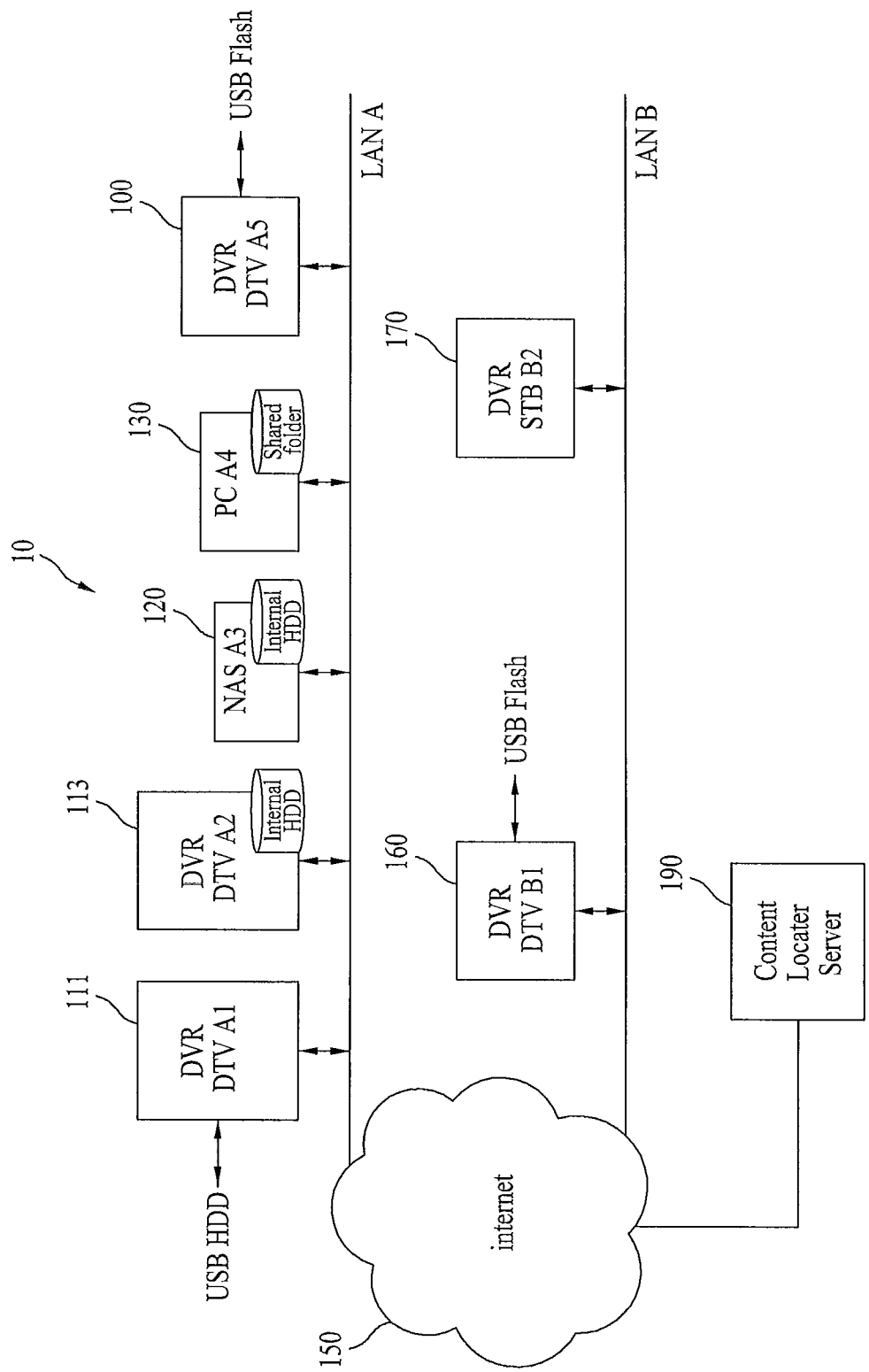
FIG. 1 is a block diagram of a content information management system according to an exemplary embodiment of the present invention.

FIG. 1 is a block diagram of a content information management system according to an exemplary embodiment of the present invention.

Referring to FIG. 1, a content information management system 10 according to an exemplary embodiment of the present invention includes a DVR Digital TV (DTV) A1 111, a DVR DTV A2 113, a Network Attached Storage (NAS) A3 120, a PC A4 130, a DVR DTV A5 100, a DVR DTV B1 160, a DVR STB B2 170, and a content locater management server 190. The DVR DTV A1 111, the DVR DTV A2 113, the NAS A3 120, the PC A4 130 and the DVR DTV A5 100 may be positioned on a Local Area Network (LAN) which may be configured as an Ethernet, for example. The DVR DTV B1 160, the DVR STB B2 170, and the content locater management server 190 are connected to the DVR DTV A5 100 over an Internet 150. In another example, the content locater management server 190 may reside on the same LAN as that of the DVR DTV A5 100.

External resources may be recording/playing devices, digital devices equipped with recording media, and the content locater management server 190. Examples of the recording/playing devices are the DVR DTV A1 111, the DVR DTV A2 113, the DVR DTV A5 100, the DVR DTV B1 160, and the DVR STB B2 170. The digital devices equipped with recording media may include the NAS A3 120 and the PC A4 130, for example.

The DVR DTV A1 111 is a DVR DTV using an external HDD as a recording medium in a Universal Serial Bus (USB) device, and the DVR DTV A2 113 uses an HDD attached to an Advanced Technology Attachment (ATA) device, as a recording medium. The NAS A3 120 has an HDD as a recording medium in it and is considered an independent recording medium in a network. The NAS A3 120 may provide a specific DTV folder as a shared folder. The PC A4 130 is a personal computer for providing a shared folder as a recording medium. The DVR DTV A5 100 uses a USB memory attached to a USB device, as a recording medium.

The content locater management server 190 manages information (i.e. content information) about contents recorded in each of nodes such as the DVR DTV A1 111, the DVR DTV A2 113, the NAS A3 120, the PC A4 130, the DVR DTV A5 100, the DVR DTV B1 160, the DVR STB B2 170, etc., and information about the location of each node (i.e. location information). Each node may request content information and location information or a search for a node having specific contents recorded in it to the content locater management server 190 in order to detect the locations of other nodes or acquire information about contents recorded in the nodes. Accordingly, the content information management system 10 of the present invention enables a specific node that wants to use recording media to use the recording media of distributed nodes through virtualization of the recording media.

Figure 2:
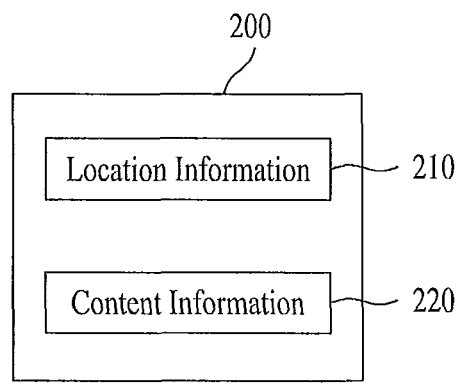
FIG. 2 is a block diagram of a content list storage structure according to an exemplary embodiment of the present invention.

FIG. 2 is a block diagram of a content list storage structure according to an exemplary embodiment of the present invention.

Referring to FIG. 2, a content list according to an exemplary embodiment of the present invention is stored separately as a first region 210 and a second region 220 on an information recording medium 200.

The first region 210 is used to record location information about an external resource. The location information refers to information with which to access the external resource or to access a recording medium of the external resource. For example, the location information may include at least one of an address, a shared folder name, a Uniform Resource Locator (URL), and a Uniform Resource Identifier (URI) of the external resource.

The second region 220 is used to store information about contents that the external resource has recorded. The content information may include content identification information for identifying the contents. The content identification information may include a transport Identifier (ID), a service ID, and an event ID. In addition, the content information may further include the recording start and end times of the contents.

Figure 3:
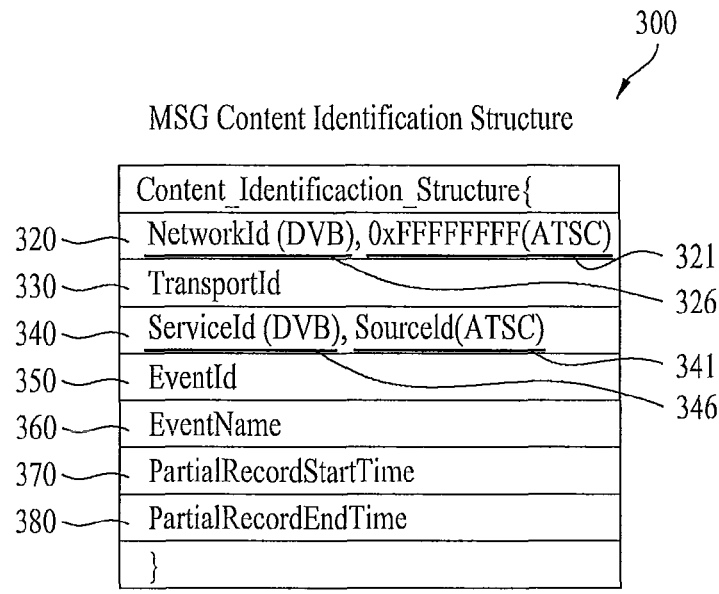
FIG. 3 illustrates a content information storage structure according to an exemplary embodiment of the present invention.

FIG. 3 illustrates a content information storage structure according to an exemplary embodiment of the present invention.

Referring to FIG. 3, content information may be stored in the form of Content_Identification_Structure 300. In Digital Video Broadcasting (DVB), the Content_Identification_Structure 300 includes a NetworkId 326, a TransportId 330, a ServiceId 346, an EventId 350, an EventName 360, a PartialRecordStartTime 370, and a PartialRecordEndTime 380. The NetworkId 326, the TransportId 330, the ServiceId 346, the EventId 350, and the EventName 360 may be obtained from an Application Information Table (AIT) or an Event Information Table (EIT). The PartialRecordStartTime 370 and the PartialRecordEndTime 380 indicate the recording start and end times of contents, respectively, forming content recording time information. The recording start time and the recording end time may be written based on time extracted from a Time and Date Table (TDT)/Time Offset Table (TOT).

In the case of Advanced Television Systems Committee (ATSC), the Network ID 326 is replaced with 0xFFFFFFFF 321 in a field 320 and the ServiceId 346 is replaced with a SourceId 341 in a field 340, in the Content_Identification_Structure 300.

In addition, the content information is stored in the second region 220 in the form of the Content_Identification_Structure 300.

Figure 4:
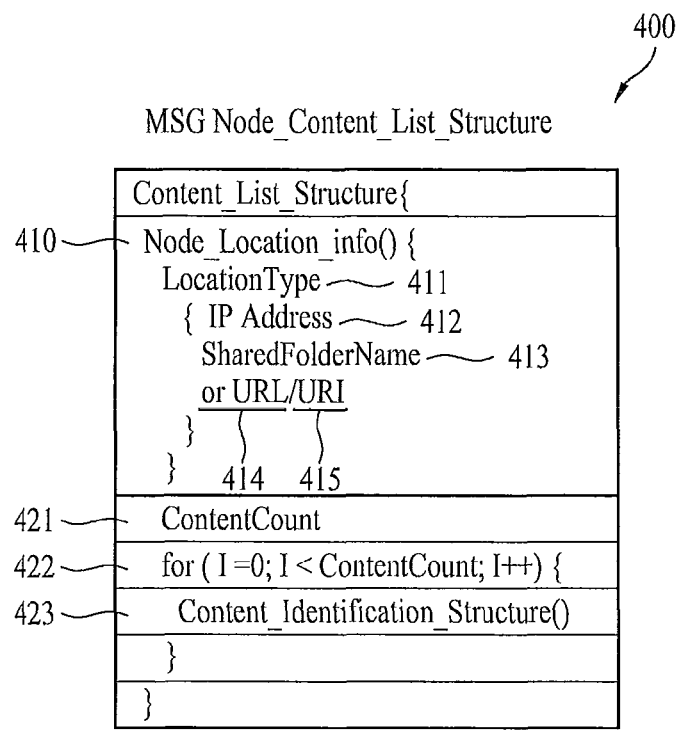
FIG. 4 illustrates a storage structure that is stored in conjunction with location information and content information according to an exemplary embodiment of the present invention.

FIG. 4 illustrates a storage structure that is stored in conjunction with location information and content information according to an exemplary embodiment of the present invention.

Referring to FIG. 4, a content list 400 may be stored in the form of a Content_List_Structure 400. The Content_List_Structure 400 includes a Node_Location_info 410, a ContentCount 421 indicating the number of contents recorded in an external resource, and as many encapsulated Content_Identification_Structures 423 as the value of the ContentCount 421. The Node_Location_info 410 may be stored in the first region 210 and the encapsulated Content_Identification_Structures 423 may be stored in the second region 220.

Location information may be stored in the form of the Node_Location_info 410. LocationType 411, which may be defined as Union Type, identifies the type of the Node_Location_info 410. That is, the LocationType 411 may be identified as Union Type such that one of an IP Address 412, a SharedFolderName 413, a URL 414, and a URI 415. The IP Address 412 indicates an Internet address of the external resource and the SharedFolderName 413 provides a name of a recording folder shared by the external resource. The URL 414 indicates the location of a file in a server that provides services of Web text, and the URI 415 indicates a unique address representing Internet resources.

As described before, content information takes the form of the Content_Identification_Structure 423. The ContentCount 421 indicates the number of contents stored in the external resource indicated by the location information. That is, the content list includes the ContentCount 421 and as many encapsulated Content_Identification_Structures 423.

The recording medium 200 of the present invention may include a plurality of Content_List_Structures 400. In other words, the recording medium 200 may include as many Content_List_Structures 400 as the number of external resources.

In another example, the recording medium 200 of the present invention may store Node_Location_Info 410 in the first region 210, and a plurality of pointer values related to the Node_Location_Info 410 and as many encapsulated Content_Identification_Structures 423 as the value of the ContentCount 421 in correspondence with the respective pointer values.

Figure 5:
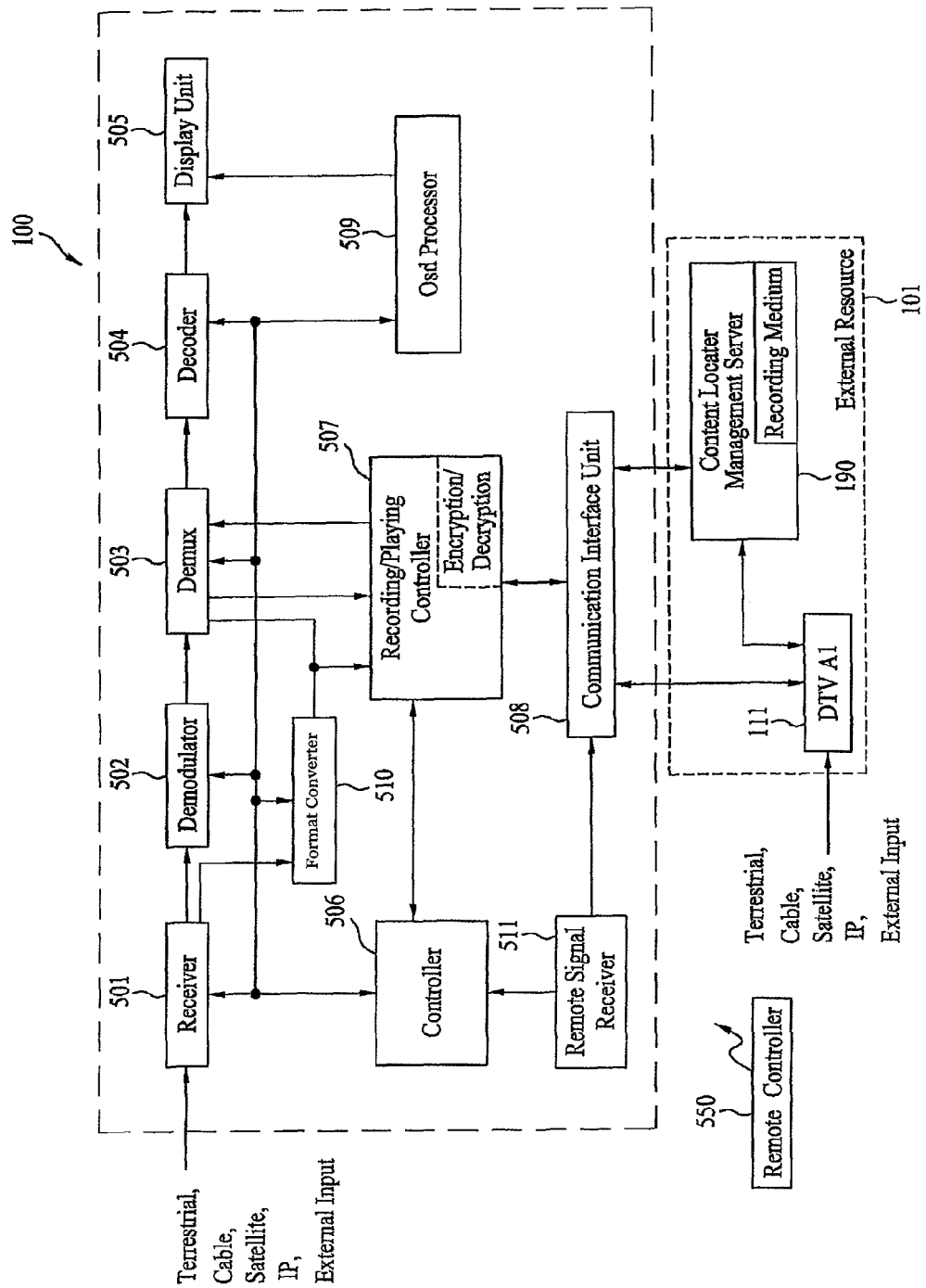
FIG. 5 is a block diagram of a recording/playing device according to an exemplary embodiment of the present invention.

FIG. 5 is a block diagram of a recording/playing device according to an exemplary embodiment of the present invention.

Referring to FIG. 5, the recording/playing device 100 according to an exemplary embodiment of the present invention may include a receiver 501, a demodulator 502, a Demultiplexer (DEMUX) 503, a decoder 504, a display unit 505, a controller 506, a recording/playing controller 507, a communication interface unit 508, an On-Screen Display (OSD) processor 509, a format converter 510, and a remote signal receiver 511. The receiver 501, the demodulator 502, the DEMUX 503, the decoder 504, and the display unit 505 will be collectively referred to as a content processor, for simplicity of description. An external resource 101 may include at least one of the content locater management server 190 and the DTV A1 111.

Operations of the controller 506 and the recording/playing controller 507 may be implemented in one of software, hardware and middleware, or in a combination of at least two of them. Also, the controller 506 may incorporate the functions of the recording/playing controller 507. In this case, the recording/playing controller 507 may not be provided. It will be described as an exemplary embodiment of the present invention that the recording/playing controller 507 is responsible for performing recording and playing functions.

In this case, the recording/playing controller 507 is referred to as a DVR engine and may incorporate encryption and decryption functions. Furthermore, the recording/playing controller 507 may incorporate encoding and decoding functions. For example, encryption and/or encoding is carried out when contents are transmitted to the external resource 101, and decryption and/or decoding is performed when contents are received from the external resource 101.

The encryption and decryption may be implemented in one of software, hardware and middleware, or in a combination of at least two of them. Also, the encoding and decoding may be implemented in one of software, hardware and middleware, or in a combination of at least two of them. Instead of the recording/playing controller 507, herein, the decoder 504 may decode contents encoded by the recording/playing controller 507.

The communication interface unit 508 is connected to the external resource 101 via one of wired and wireless networks. For the connection to the external resource 101, the communication interface unit 508 includes at least one external connection port, for example, a Universal Serial Bus (USB) port or an Institute of Electrical and Electronic Engineers (IEEE) 1394 port.

The USB port may be connected to a USB hub with a plurality of USB ports. That is, the USB port may be one installed directly to a digital TV or a USB port included in the connected USB hub.

In accordance with an exemplary embodiment of the present invention, the communication interface unit 508 is connected to the external resource 101 via a USB port of a digital TV over the wired or wireless network.

There are two types of physical USB connections, namely cabled or wired USB connection and wireless USB connection.

The wired USB connection relies on use of a USB cable. For the wired USB connection, the USB port of the communication interface unit 508 of the recording/playing device 100 may be connected to a wired LAN card (or a wired-wireless integrated LAN card) which is in turn connected to the external resource 101 by a USB cable.

The wireless USB connection provides connectivity between the communication interface unit 508 of the digital TV and the external resource 101 without using a USB cable. In this case, a wireless LAN card (or a wired-wireless LAN card) is connected to the USB port of the communication interface unit 508. The USB port may be connected to a USB memory or another digital device.

The communication interface unit 508 includes a wired/wireless LAN card driver and a network driver in order to communicate with the external resource 101 via the wired/wireless LAN card. The communication interface unit 508 may use various network interfacing schemes to transmit/receive contents and control signals to/from the external resource 101. One of the network interfacing schemes is USB interfacing, for example.

A user may request recording and play through an input device. The recording and play requests may be input directly to the digital TV through the input device or indirectly through the external resource 101. In the latter case, the external resource 101 receives the recording and play requests from the input device. The input device may be any device for inputting the recording and play requests, such as a remote controller, a touch screen, a mouse, a keyboard, a key panel of a digital TV, etc.

An exemplary embodiment of the present invention is described as using a remote controller 550 as the input device. Key signals associated with the recording and play requests from the remote controller 550 are provided to the controller 506 through the remote signal receiver 511. The controller 506 interprets the key signals and, if they are for requesting contents, outputs them to the recording/playing controller 507. For example, when the remote controller 550 has an interactive function, it may receive a signal from the digital TV and the remote signal receiver 511 further includes a remote signal transmitter. Herein, a signal associated with the play request includes a content request command. The content request command may be a content play command or a content search command. The content play command is used to play recorded contents, including a time shift request. The content search command requests information about an external resource having specific contents.

The receiver 501 of the recording/playing device 100 may include one or more tuners and receive contents of at least one of terrestrial broadcasting, cable broadcasting, and satellite broadcasting through the tuners. A tuner may be provided for each broadcasting source, for example, each of terrestrial, cable and satellite broadcasting sources. Alternatively, an integrated tuner may be provided for the terrestrial, cable and satellite broadcasting sources. For terrestrial broadcasting, at least one digital tuner and at least one analog tuner may be used, or a digital-analog integrated tuber may be provided. Regarding terrestrial broadcasting for example, the tuner(s) tunes(tune) a broadcasting signal of a user-selected channel among broadcasting signals (i.e. terrestrial broadcast contents) received through an antenna and outputs the tuned broadcasting signal to the demodulator 502. The demodulator 502 demodulates the broadcasting signal reversely to a modulation operation.

The receiver 501 may receive contents over the Internet. Also, the receiver may include one or more external input/output ports and receive contents from external devices via the external input/output ports. The input/output ports may be Audio/Video (A/V) ports, component ports, Red, Green, Blue (RGB) ports, Digital Visual Interface (DVI) ports, High-Definition Multimedia Interface (HDMI) ports, or the like. An external device such as a VCR, an analog TV or the like may be connected to an A/V port, whereas an external device such as a DVD player, a digital TV, a satellite STB, a cable STB, a PC or the like may be connected to a component port, an RGB port, and an HDMI port.

The format converter 510 simply outputs high-quality contents received from an external device to the DEMUX 503 or outputs them to the recording/playing controller 507 after downconversion. That is, upon selection of display, the external high-quality contents are simply provided to the DEMUX 503 without downconversion of the resolution of the contents, and upon selection of recording, they are provided to the recording/playing controller 507 after downconversion of their resolution. The downconversion may be performed in many ways and the resolution of the downconverted contents may vary with the downconversion method used. In accordance with an exemplary embodiment of the present invention, downconversion to a CCIR656 format of 480i (i denotes interlaced scanning) is performed. If the contents received from the external device are analog, the format converter 510 digitizes them and outputs the digital contents to the DEMUX 503 or the recording/playing controller 507.

The demodulator 502 demodulates the contents received from the receiver 501 and provides the demodulated contents in the form of a Transport Stream (TS) to the DEMUX 503.

The DEMUX 503 demultiplexes the contents received from the demodulator 502 or the format converter 510 into an audio Element Stream (ES) and a video ES and outputs the audio ES and the video ES respectively to an audio decoder and a video decoder of the decoder 504. If a plurality of broadcasting programs are multiplexed into a single channel, the DEMUX 503 chooses only broadcast contents of a user-selected program, demultiplexes the broadcast contents into an audio ES and a video ES, and provides the audio and video ESs to the decoder 504. If the demodulated contents include a data stream and a system information stream, the DEMUX 503 also demultiplexes the contents into the data stream and the system information stream and provides the streams to corresponding blocks, which is not a feature of the present invention and thus will not be described herein in detail.

Upon selection of recording, the DEMUX 503 simply outputs the contents received from the demodulator 502 or the format converter 510 to the recording/playing controller 507, or demultiplexes the received contents into an audio ES and a video ES and provides the audio and video ESs to the recording/playing controller 507. If a plurality of broadcasting programs are multiplexed into a single channel, the DEMUX 503 chooses only broadcast contents of a user-selected program to be recorded and provides them to the recording/playing controller 507. An exemplary embodiment of the present invention is implemented, in which each channel delivers one broadcasting program.

The decoder 504, which includes the audio and video decoders, decodes the audio and video ESs received from the demultiplexer 503 by their respective decoding algorithms. The display unit 505 converts the decoded audio data received from the decoder 504 to analog audio data and outputs them through a speaker, and converts the decoded video data received from the decoder 504 to a display format and displays the converted video data on a screen. Upon receipt of OSD data from the OSD processor 509, the display unit 505 mixes the video data with the OSD data and outputs the mixed data on the screen.

Transmission/reception of contents and control signals between the communication interface unit 508 and the external resource 101 may be carried out in an Ethernet manner. For the Ethernet-based transmission/reception, the communication interface unit 508 has a LAN card that operates with Ethernet in an exemplary embodiment of the present invention. The LAN card is at least one of a wired LAN card and a wireless LAN card, or it is a wired-wireless integrated LAN card.

In the case where the communication interface unit 508 is connected to the external resource 101 wiredly (i.e. by an Ethernet cable), upon selection of recording, the communication interface unit 508 transmits contents to be recorded, received from the recording/playing controller 507 to the external resource 101 in a wired Ethernet manner, so that the external resource 101 records the contents.

In the case where the communication interface unit 508 is connected to the external resource 101 wirelessly, upon selection of recording, the communication interface unit 508 transmits contents to be recorded, received from the recording/playing controller 507 to the external resource 101 in a wireless Ethernet manner, so that the external resource 101 records the contents.

Herein, data may be transmitted on an Ethernet MAC frame basis between the communication interface unit 508 and the external resource 101. In this case, the communication interface unit 508 and the external resource 101 each may include an Ethernet MAC frame parser (not shown) for parsing only the contents of a data region.

Figures 6, 7:
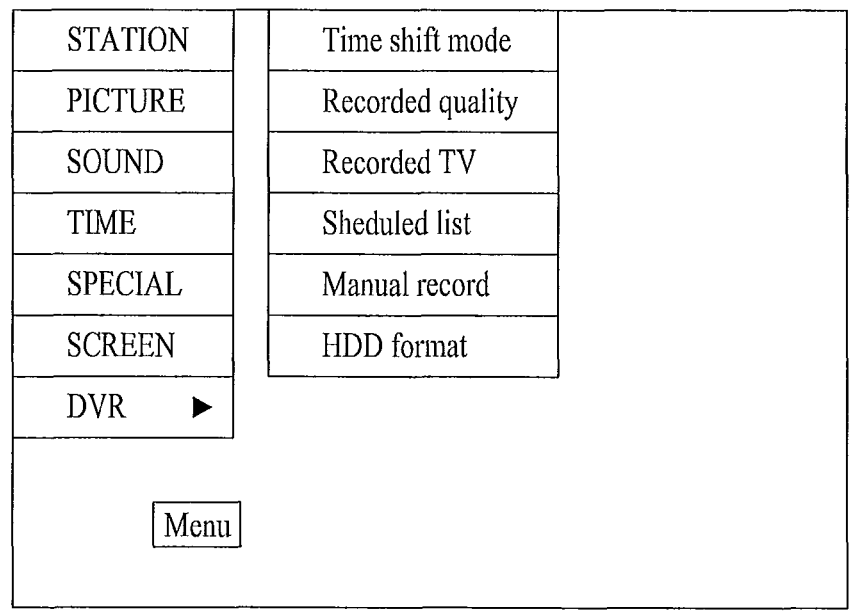
FIG. 6 illustrates an Ethernet Media Access Control (MAC) frame according to an exemplary embodiment of the present invention.
FIGS. 7 and 8 illustrate exemplary DVR functions that are available when DVR mode is activated.

FIG. 6 illustrates an Ethernet MAC frame according to an exemplary embodiment of the present invention.

Referring to FIG. 6, the communication interface unit 508 and the external resource 101 each may include an Ethernet MAC frame generator (not shown) for converting recorded or played contents to an Ethernet MAC frame.

The Ethernet MAC frame includes a 7/1-byte preamble/Start of Frame Delimiter (SFD), a 6-byte destination address, a 6-byte source address, a 2-byte data length, 45- to 1500-byte data, and a 4-byte checksum. The 7-byte preamble is used for synchronization between a source and a destination. The 1-byte SFD indicates the start of the Ethernet MAC frame. The 2-byte data length indicates the length of the following data. The 4-byte checksum is a 32-bit hash code for use in an error check of the frame.

According to an exemplary embodiment of the present invention, when the DTV A1 111 transmits recorded contents to the communication interface unit 508, the Ethernet frame has the address of the wireless LAN card of the DTV A1 111 in the source address, the address of the recording/playing device 100 in the destination address, and the recorded contents in the data.

In an exemplary embodiment of the present invention, upon receipt of an Ethernet MAC frame having the configuration illustrated in FIG. 6 from the DTV A1 111 through the communication interface unit 508, the recording/playing device 100 parses only recorded contents included in the data region of the Ethernet MAC frame and plays the parsed recorded contents.

Meanwhile, DVR mode may be activated automatically or by user selection in the present invention. Alternatively, the DVR mode may be activated automatically or manually by user selection, depending on whether the DVR mode is on or off. When the DVR mode is activated, DVR functions such as time shifting may be performed. If the DVR mode is deactivated, the DVR functions are not performed. For example, if the DVR mode is deactivated, a function corresponding to a DVR menu item is not executed despite selection of the DVR menu item, and even though a DVR command is entered through the input device such as the remote controller 550, a function corresponding to the DVR command is not performed.

Figure 8:
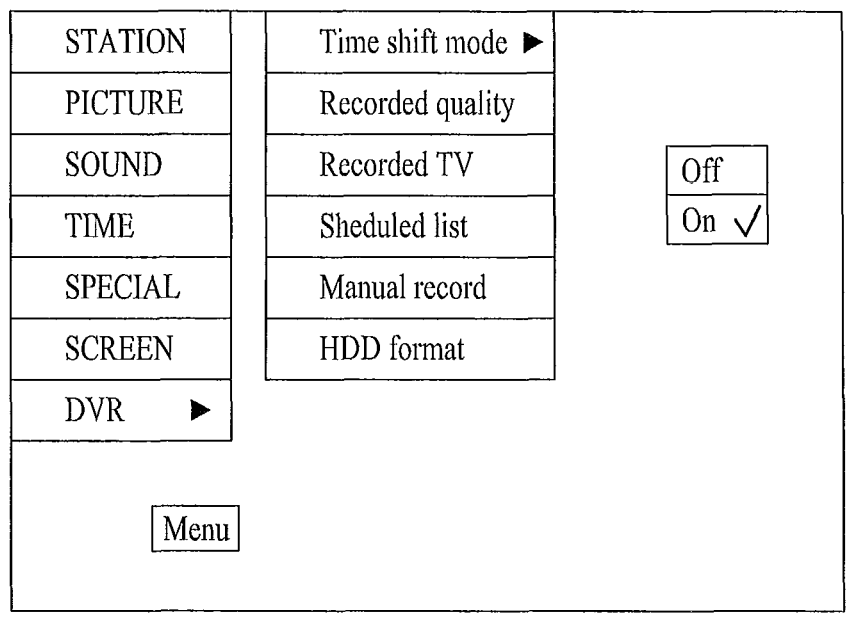

FIGS. 7 and 8 illustrate exemplary DVR functions that are available when the DVR mode is activated.

FIG. 7 illustrates an exemplary main menu that is displayed when the DVR mode is activated. The activation of the DVR mode in turn activates DVR menu items of the main menu and DVR submenus that are available in the activated DVR mode are displayed as illustrated in FIG. 7. To enable the user to be aware of the activated DRV mode, the DVR menu items are rendered transparent, highlighted, marked in a different color, shaded, or displayed in OSD text.

In the illustrated case of FIG. 7, the submenus of Time shift mode, Recorded Quality, Recorded TV, Scheduled List, Manual Record, and HDD Format are displayed as the activated DVR menu items. The number, positions, sequence, and operations of the submenus included in the activated DVR menu are a merely exemplary application, to which the exemplary embodiments of the present are not limited because they may be readily modified by those skilled in the art.

The user may set automatic/manual time shift mode by the Time Shift Mode submenu. When On is selected for the Time Shift Mode submenu, the automatic time shift mode is set, and when Off is selected for the Time Shift Mode submenu, the manual time shift mode is set.

Therefore, when upon power-on of the digital TV, the DVR mode is activated and the automatic time shift mode is set, the controller 506 requests time shifting of broadcast contents of a current received and demodulated channel to the recording/playing controller 507.

If the DVR mode is activated but the manual time shift mode is set upon power-on of the digital TV, the controller 506 requests time shifting of broadcast contents of a current received and demodulated channel to the recording/playing controller 507, only if the user selects the time shift function through the input device such as the remote controller 550 or by the menu. When an external interrupt signal is received during displaying received broadcast contents, the time shift mode may also be set automatically. For example, when an incoming call is received during displaying broadcast contents on the digital TV, the time shift mode may also be set automatically.

When upon power-on of the digital TV, the DVR mode is activated but the manual time shift mode is set, the user may be prompted to determine as to whether the time shifting is to be performed. For example, the OSD processor 509 may OSD-process a message prompting the user to make a decision as to whether to perform time shifting and display the OSD message on the display unit 505. During viewing broadcast contents, the user may select at any time whether to invoke the time shifting using the Time Shift Mode submenu, a predefined key for time shifting in the input device such as the remote controller 500, or the like.

Upon receipt of a time shift request from the controller 506, the recording/playing controller 507 determines whether another digital TV is time-shifting broadcast contents of an intended channel using the recording medium of the DTV A1 111. If only the recording/playing device 100 is connected to the DTV A1 111 or if a plurality of digital TVs are connected to the DTV A1 111 but any other digital TV does not time-shift the broadcast contents of the channel using the recording medium of the DTV A1 111, the recording/playing controller 507 transmits the broadcast contents of the channel to the DTV A1 111 through the communication interface unit 508, starting from a requested time of the time shift. The DTV A1 111 then records the received broadcast contents in a time-shift recording region of its internal recording medium. Thereafter, the user of the recording/playing device 100 may determine whether to play the previous video stored in the time-shift recording region by means of the input device such as the remoter controller 550. Upon user selection of a time to play the broadcast contents stored in the time-shift region of the recording medium of the DTV A1 111, the recording/playing controller 507 reads data of the broadcast contents, starting with data at the user-selected play time from the recording medium of the DTV A1 111 through the communication interface unit 508. If the data of the broadcast contents received from the DTV A1 111 have been encrypted, the recording/playing controller 507 decrypts them and outputs the decrypted data to the DEMUX 503. Also, if the data of the broadcast contents have been encoded, the recording/playing controller 507 decodes them and outputs the decoded data to the DEMUX 503.

According to the present invention, if the digital TV has simultaneous screen functions, it may display at least one on-going live broadcast content and a time-shifted content on one screen at the same time.

The simultaneous screen functions refer to displaying independent pictures in a main screen and at least one sub-screen that are split from the screen. The simultaneous screen functions include Picture in Picture (PIP), Picture Out Picture (POP), double windows (double pictures), etc. In PIP, one or more sub-screens are displayed within a main screen, whereas in POP, one or more sub-screens are displayed on the left (or the right) of a main screen. In the double windows function, the screen is split into left and right sub-screens and a main picture is displayed on the left sub-screen, while a sub-picture is displayed on the right sub-screen. The left and right sub-screens may be of the same size or different sizes.

For example, if the PIP function is selected and time shifting is on-going, current received live broadcast contents may be displayed on the main screen, while displaying broadcast contents read and played from the recording medium of the DTV A1 111 on the sub-screen. Or the live broadcast contents may be displayed on the sub-screen, while displaying the played broadcast contents on the main screen. In another example, when time shifting is not performed, that is, already-recorded broadcast contents B are played simultaneously with recording broadcast contents A, if the PIP function is selected, the broadcast contents A may be displayed on the main screen, while displaying the broadcast contents B on the sub-screen. In addition, keys may be designated to invoke the PIP, POP, and double windows functions, respectively in the input device such as the remote controller 550. Alternatively, a single key is designated for the PIP, POP, and double windows functions such that the PIP, POP, or double windows function may be selected according to the number of sequential pressings of the key. Also, the picture of the main screen may be exchanged with that of the sub-screen.

The recording medium of the DTV D1 111 may be divided into a time-shift recording region and a semi-persistent recording region. Contents received at the DTV A1 111 may be stored in the time-shift recording region or the semi-persistent recording region depending on the recording type of the contents. For instance, time shift-requested contents are stored in the time-shift recording region and contents for which instant recording or reserved recording is requested are stored in the semi-persistent recording region.

It may be said that the time-shift recording region is a temporary storage for storing a small amount of data. For example, if the time-shift recording region has the capacity of storing two hours of data, it is full after storing data for two hours. Then current received contents may be stored by deleting the data of the time-shift recording region in a first-input first-deleted fashion, or overwriting new data on the existing data in the time-shift recording region. Different time-shift recording regions may be allocated for digital TVs connected to the DTV A1 111 or a single time-shift recording region may be allocated separately in an appropriate manner for the digital TVs.

Meanwhile, if the recording/playing controller 507 detects that another digital TV is already time-shifting broadcast contents of an intended channel using the recording medium of the DTV A1 111, upon receipt of a time shift request from the controller 506, it performs time shifting by sharing the broadcast contents of the intended channel under time shifting of another digital TV, without storing the broadcast contents. For example, if the digital TV 212 has already been time-shifting broadcast contents of a time shift-requested channel, the recording/playing controller 507 of the recording/playing device 100 does not transmit the broadcast contents of the time shift-requested channel to the DTV A1 111. Rather, it shares the broadcast contents of the channel that is being time-shifted by the digital TV 212. That is, the recording/playing controller 507 joins the broadcast contents that the digital TV 212 is storing in the recording medium of the DTV A1 111. Since the recording/playing device 100 is now capable of playing data preceding the time shift request, the user may view the contents already broadcast before the time shift request. Also, this obviates the need for storing the same data redundantly in the recording medium of the DTV A1 111, thereby avoiding unnecessary waste of the recording medium.

Without the foregoing function, the recording/playing device 100 transmits the broadcast contents of the time shift-requested channel to the DTV A1 111, for recording in the recording medium, irrespective of whether another digital TV is time-shifting the broadcast contents. As a result, since a plurality of digital TVs store the same data in different regions of the recording medium of the DTV A1 111, the recoding medium is unnecessarily consumed. Moreover, the recording/playing device 100 cannot display data broadcast before the time of the time shift request. That is, since a typical time shift function allows for storage of only broadcast contents following the time of the time shift request within the capacity (or time) of the time-shift recording region of a predetermined recording medium, broadcast contents preceding the time shift-requested time cannot be displayed. To avert this problem, when a plurality of digital TVs are connected to the DTV A1 111 and a time shift request is received from one of the digital TVs, it is determined whether another digital TV is time-shifting broadcast contents of an intended channel using the recording medium of the DTV A1 111 in the present invention. If the broadcast contents of the intended channel are being time-shifted by another digital TV, the digital TV that has received the time shift request performs time shifting by sharing the broadcast contents being time-shifted, without storing the broadcast contents.

Figure 9:
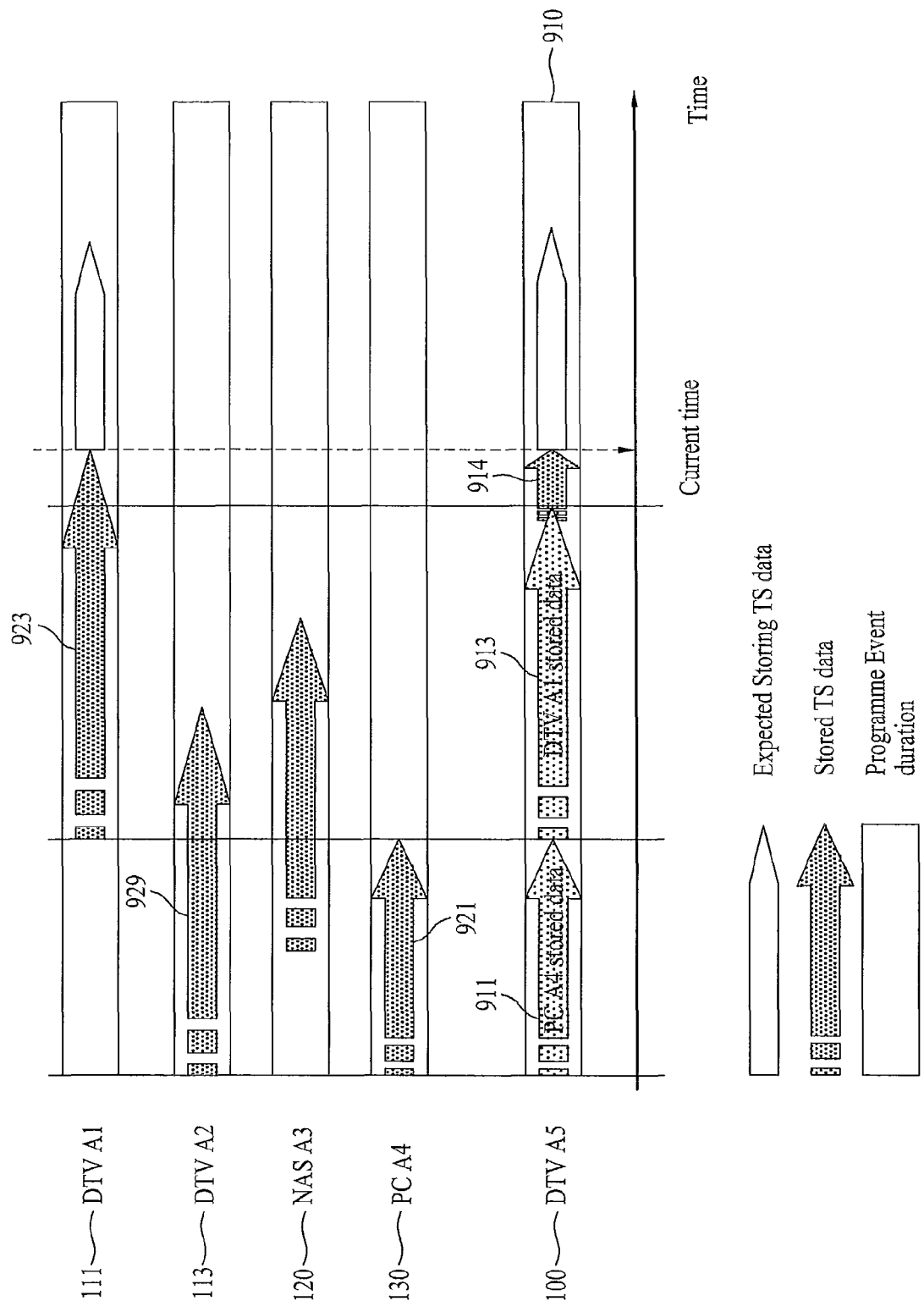
FIG. 9 is a conceptual view illustrating a method for searching for contents in the recording/playing device according to an exemplary embodiment of the present invention.

FIG. 9 is a conceptual view illustrating a method for searching for contents in the recording/playing device.

Referring to FIG. 9, upon receipt of a content request command, the recording/playing controller 507 searches for the external resources 111, 113, 120 and 130 having requested contents 910, based on content identification information about the contents 910. The recording/playing controller 507 may request the external resource search to the external resource 101. For this purpose, the recording/playing controller 507 manages a content list containing location information about external resources. That is, the recording/playing controller 507 receives location information from the external resources 111, 113, 120 and 130 and updates the content list based on the location information. The location information includes at least one of an address, a shared folder name, a URL, and a URI.

The recording/playing controller 507 transmits a content search request including content identification information to the external resource 101 based on the location information. Then the external resource 101 searches a content list for the DTV A1 111 and the PC A4 130 having the requested contents 910 based on the content identification information about the contents 910 and transmits information about the DTV A1 111 and the PC A4 130 as the results for the content search request to the recording/playing device 100. The external resource 101 may use a transport ID, a service ID, and an event ID, or an event name as the content identification information. In the former case using a transport ID, a service ID, and an event ID, the external resource 101 compares the transport ID, service ID and event ID of the requested contents 910 with transport IDs, service IDs and event IDs of contents stored in the external resources 111, 113, 120 and 130, and if they are identical, determines the external resources 111, 113, 120 and 130 as storing the contents 910.

The recording/playing controller 507 receives the results for the content search request from the external resource 101 and receives the contents 910 from the DTV A1 111 and the PC A4 130.

Or the recording/playing controller 507 may autonomously search for the external resources having the contents 910. For the autonomous search, the recording/playing controller 507 further includes content information in the content list, for management. The content information contains content identification information about contents stored in the external resources indicated by the location information. As stated before, the content information identifies contents, including a transport ID, a service ID, and an event ID, for example.

The recording/playing controller 507 detects the DTV A1 111 and the PC A4 130 having the contents 910 from the content list and receives the contents 910 from the DTV A1 111 and the PC A4 130. Herein, the recording/playing controller 507 compares the content identification information about the contents 910 with content identification information listed in the content list, for detecting the external resources having the contents 910. If the contents 910 are a Moving Pictures Expert Group 2 (MPEG2) TS, the recording/playing controller 507 compares the transport ID, service ID, and event ID of the contents 910 with the transport IDs, service IDs, and event IDs listed in the content list and if there are external resources having the same transport ID, service ID, and event ID, determines the external resources as storing the contents 910.

If there is no external resources having the entire requested contents 910, the recording/playing controller 507 may search for external resources each having a segment of the contents 910, receive the content segments from the external resources, and play them as the contents 910. For this purpose, the recording/playing controller 507 further includes and manages content recording time information in the content information of the content list. The content recording time information specifies recording start and end times.

The recording/playing controller 507 searches for the DTV A1 111 and the PC A4 130 having content segments 921 and 923 based on the content recording time information included in the content information, receives the content segments 921 and 923 from the DTV A1 111 and the PC A4 130, and plays them as the contents 910. That is, the recording/playing controller 507 plays a block 911 being a part of the contents 910 by receiving the content segment 921 from the PC A4 130 and plays a block 913 being another part of the contents 910 by receiving the content segment 923 from the DTV A1 111. Obviously, the recording/playing controller 507 may play the block 911 by receiving a content segment 929 from the DTV A2 113.

In an example, along with the content segments from the external resources, the recording/playing controller 507 may receive independent clock information used for coding schemes of the content segments and generate the requested contents by combining the received content segments based on the clock information. That is, the recording/playing controller 507 accurately locates the boundary between content segments by comparing clock information about the content segments, while deleting the overlap between the content segments, such that the content segments are combined to seamless and non-overlapped video frames. The clock information may be a Program Clock Reference (PCR) of a Transport Stream (TS).

In another example, the recording/playing controller 507 may calculate the independent clock information used for the coding schemes of the content segments based on the recording time information listed in the content list and request the content segments to the external resources by including the clock information in the requests. Upon receipt of a content segment request including clock information, each external resource may provide a content segment corresponding to the clock information to the recording/playing controller 507. That is, the external resources may extract the content segments corresponding to the received clock information and provide the content segments to the recording/playing device 100.

In a further example of requesting content segments to a plurality of external resources, the recording/playing controller 507 may request content segments to some external resources by including clock information in the requests, while receiving clock information content segments together with clock information from the other external resources. Then the recording/playing controller 507 may create the requested contents by combining the content segments received from the former external resources based on the received clock information and the content segments received from the latter external resources.

Upon receipt of a past-time play time shift request as a content request command during playing a current content segment 914, the recording/playing controller 507 may also search for external resources having past-time contents and play the past version of the current played contents 910.

During playing the contents, the recording/playing controller 507 may calculate information about a requested past play time according to a system time based on time extracted from a TDT/TOT or according to the PCR of a TS, searches for an external resource having the contents corresponding to the past play time by comparing the calculated time information with the content recording time information listed in the content list, receive the contents from the searched external resource, and play the contents of the requested past time.

When the recording/playing controller 507 receives contents from a plurality of external resources, it may combine contents received from the external resources into the requested contents based on received clock information.

Also, the recording/playing controller 507 searches for an external resource having all or part of the contents corresponding to the requested past time by comparing the past time with the content recording time information included in the content list and requests the contents to the external resource. The recording/playing controller 507 may calculate independent clock information used for a coding scheme of the whole or partial contents based on the recording time information of the whole or partial contents and request the contents to the external resources by including the clock information in the request. Upon receipt of the content request including the clock information, the external resource may provide contents corresponding to the clock information. That is, the external resource may extract a content segment corresponding to the clock information and provide it to the recording/playing controller 507.

To acquire a content list or content information, the recording/playing controller 507 requests the content list to external resources indicated by location information or content information stored in them.

To share the content list or the content information with the external resource 101, the recording/playing controller 507 transmits content information about contents to the external resource 101 during recording the contents, and content information about the recorded contents to the external resource 101 upon completion of the recording.

The recording/playing controller 507 may transmit its location information or content list to the external resource 101. For example, the recording/playing controller 507 may transmit the location information or the content list to the external resource 101 every predetermined interval. In another example, the recording/playing controller 507 transmits the location information or the content list to the external resource 101, upon request of the external resource 101.

To join the content information management system 10 of the present invention, the recording/playing controller 507 may broadcast a message indicating its active state or transmit it to the external resource 101 indicated by location information, when the recording/playing controller 507 is in the active state.

Figure 10:
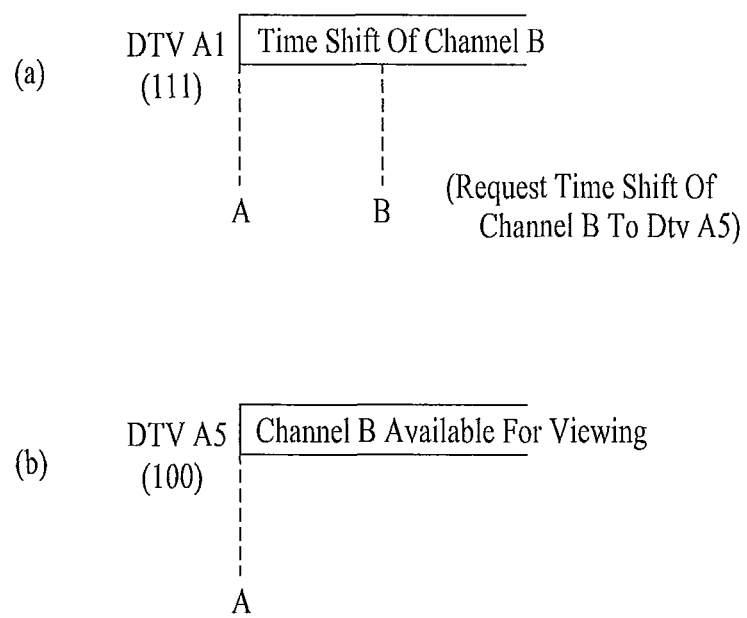
FIGS. 10 to 12 illustrate exemplary implementations of a time shift using an external recording medium in the recording/playing device.
Figure 11:
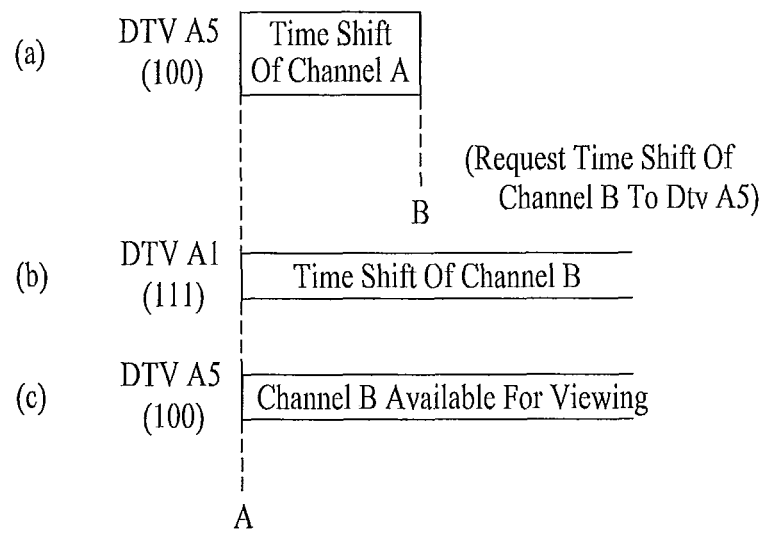
Figure 12:
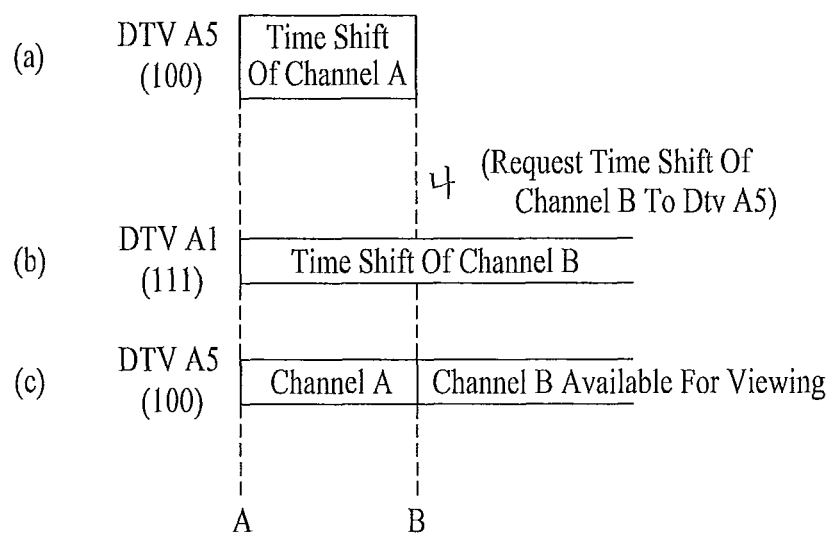

FIGS. 10 to 12 illustrate exemplary implementations of a time shift using an external recording medium in the recording/playing device.

Referring to FIG. 10, the DTV A1 111 has been time-shifting a channel B since time point a and the recording/playing device 100 receives a request for time-shifting the channel B at time point b. This case may occur when the DVR mode is activated, the time shift mode is set, and contents are received on the channel B, upon power-on of the recording/playing device 100 at time point b. Or this case may occur when the user sets the time shift mode through the remote controller 550 or the menu at time point b during viewing the channel B without time shifting.

Since the DTV A1 111 has been time-shifting the channel B since time point a before the recording/playing device 100 receives the time shift request for the channel B at time point b, the recording/playing device 100 performs time shifting by sharing the contents of the channel B that are being time-shifted in the DTV A1 111, without separately storing the contents of the channel B in the recording medium.

Conventionally, the user may not view the contents of the channel B broadcast before time point b in this situation. According to the present invention, however, since the recording/playing device 100 can share the contents of the channel B being time-shifted by the DTV A1 111, the user of the recording/playing device 100 may view the contents of the channel B from time point a, as illustrated in FIG. 10. Herein, the recording/playing device 100 may display a time-shift progress bar in OSD and notify the user that he or she may view the contents of the channel B starting with contents corresponding to time point a. The user may select a play time after time point a through the input device such as the remote controller 550. In addition, at least one thumbnail image may be generated out of pictures of the channel B and displayed at a predetermined position of the screen in the present invention. The thumbnail may be an image at time point a or any other image after time point a. While the thumbnail may be positioned at any place of the screen, it is displayed at the bottom of the screen in an exemplary embodiment of the present invention.

The thumbnail may be generated based on an Intra-coded (I) frame or by motion compensation of a Predictive-coded (P) or Bidirectional predictive (B) frame among the video frames of the channel B stored in the recording medium of the external resource 110 after time point a. A thumbnail may be created every predetermined time (e.g. 10 minutes). Thus, the user may easily infer contents broadcast at a predetermined time point and choose a play time, from the thumbnails. The display of a progress bar or a thumbnail may be applied to FIGS. 7 and 8 which will be described later, in the same manner.

Referring to FIG. 11, the recording/playing device 100 receives a request for time-shifting the channel B at time point b during time-shifting the channel A from time point a, as indicated by reference character (a). This case may occur when the user of the recording/playing device 100 shifts from the channel A viewed since time point a to the channel B at time point b, with the DVR mode activated and the time shift mode set. As indicated by reference character (b), the DTV A1 111 has been time-shifting the channel B in its recording medium since time point a and thus the recording/playing device 100 may time-shift contents of the channel B by sharing the contents of the channel B being time-shifted by the DTV A1 111 without storing the contents of the channel B on a recording medium. Conventionally, the user may not view the contents of the channel B that have been broadcasted before time point b. In contrast, the user of the recording/playing device 100 may view the contents of the channel B, starting from time point a, as indicated by reference character (c).

When the user of the recording/playing device 100 shifts from the channel A for which time-shifting has been on-going since time point a to the channel b at time point b, he or she may want to view contents of the channel A that have been time-shifted before until time point b. In the present invention, if another digital TV has already been time-shifting intended contents when one digital TV receives a time shift request for the contents, the user may be allowed to make a choice as to whether to time-shift the channel that another digital TV is time-shifting, by the OSD function.

That is, the recording/playing device 100 receives a time shift request for the channel B at time point b during time-shifting the channel A since time point a, as indicated by reference character (a) in FIG. 12. On the assumption that the DTV A1 111 has been time-shifting the channel B using the recording medium of the external resource 110 since time point a, when the user of the recording/playing device 100 makes the choice of not time-shifting the channel that is being time-shifted by another digital TV, from a selection message displayed in OSD by the OSD processor 509, he or she may view the channel A from time point a to time point b and then the channel B after time point b, as indicated by reference character (c) in FIG. 12. On the other hand, if the user selects a time shift of the channel that another digital TV is time-shifting from the selection image, he or she may view the channel B from time point a, as indicated by reference character (c) in FIG. 11. In another example, if the user selects to view the contents of the channel that have been broadcast before time point b from the selection message, he or she may view the contents of both channels A and B that have been broadcast before time point b. This may be possible because the contents of the channels A and B before time point b are stored in the recording medium.

Figure 13:
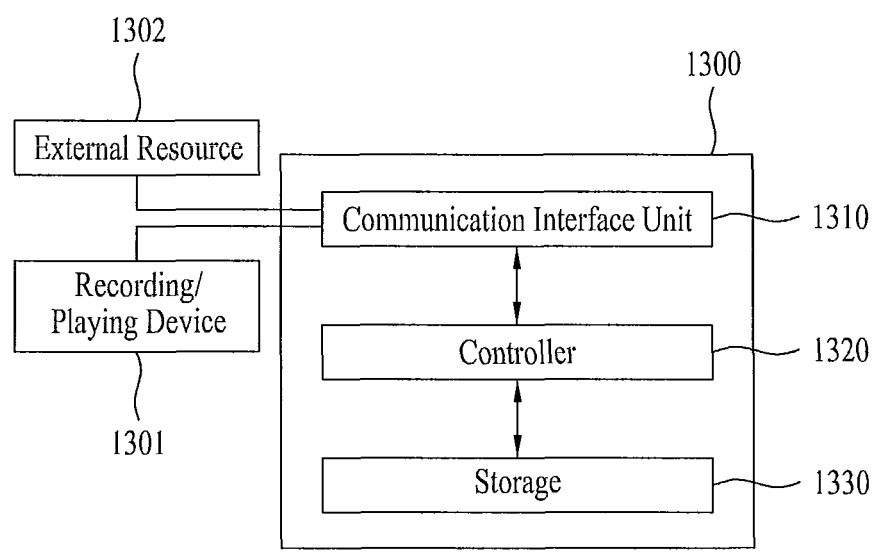
FIG. 13 is a block diagram of a server for managing content location information according to an exemplary embodiment of the present invention.

FIG. 13 is a block diagram of a server for managing content location information according to an exemplary embodiment of the present invention.

Referring to FIG. 13, a content locater management server 1300 of the present invention includes a communication interface unit 1310, a controller 1320 and a storage 1330.

The communication interface unit 1310 interfaces data transmission/reception with at least one recording/playing device 1301 or at least one external resource 1302 connected to a network. The recording/playing device 1301 corresponds to the recording/playing device 100 according to the present invention.

The storage 1330 stores a content list. The content list contains location information about the recording/playing device 1301 and information about contents recorded at the recording/playing device 1301, received from the recording/playing device 1301. The content information includes content identification information.

The controller 1320 receives the location information or the content information from the recording/playing device 1301 and updates the content list stored in the storage 1330 based on the received location information or content information.

Upon receipt of a content search request from the recording/playing device 1301, the controller 1320 searches the content list stored in the storage 1330 for requested contents. Herein, the controller 1320 may search for a recording/playing device having the requested contents recorded therein based on content identification information about the requested contents.

The controller 1320 transmits the search result to the recording/playing device 1301 in response to the received content search request.

Figure 14:
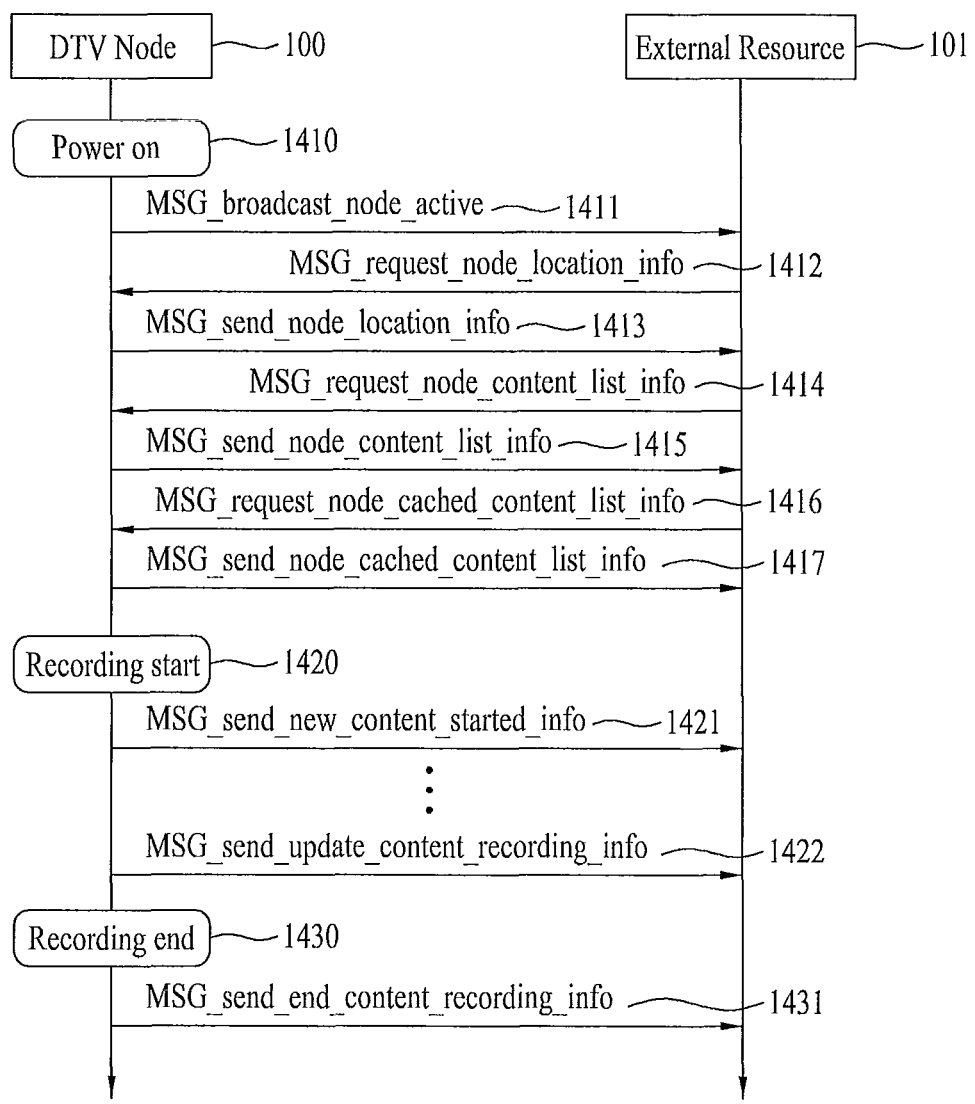
FIG. 14 is a diagram illustrating a signal flow for message transmission between the recording/playing device and an external resource according to an exemplary embodiment of the present invention.

FIG. 14 is a diagram illustrating a signal flow for message transmission between the recording/playing device of the present invention and an external resource.

Referring to FIG. 14, when it is placed in active state 1410, the recording/playing device 100 broadcasts a message 1411 indicating that it is in the active state. The active state 1410 may be set upon power-on or wake-up, for example.

The external resource 101 transmits a message 1412 requesting location information to the recording/playing device 100. The location information may take the form of Node_Location_Info 410.

The external resource 101 transmits a message 1414 requesting a content list. The recording/playing device 100 then transmits a message 1415 containing a main content list stored in its local storage to the external resource 101. The local storage may be an HDD, a USB HDD or a USB storage connected to an ATA, for example.

In addition, the external resource 101 may transmit a message 1416 requesting a cache content list to the recording/playing device 100. If the recording/playing device 100 has cached a content list of another node within the content information management system 10, it transmits a message 1417 containing the cache content list to the external resource 101. The cache content list refers to a content list received from another node. The cache content list may take the form of Content_List_Structure 400.

When the recording/playing device 100 starts to record, as indicated by reference numeral 1420, it transmits a message 1421 including content information about current contents being recorded to the external device 101. Along with the progress of the recording, the recording/playing device 100 may transmit a message 1422 including updated content information periodically to the external resource 101.

Upon completion of the recording as indicated by reference numeral 1430, the recording/playing device 100 transmits a message 1431 indicating the completion of the recording to the external resource 101.

Because the recording/playing device 100 repeats the transmission of MSG_broadcast_node_active 1411 to the transmission of MSG_send_end_content_recording_info 1430 every predetermined time, the same content list is cached and shared among nodes forming the content information management system 10 of the present invention.

Figure 15A:
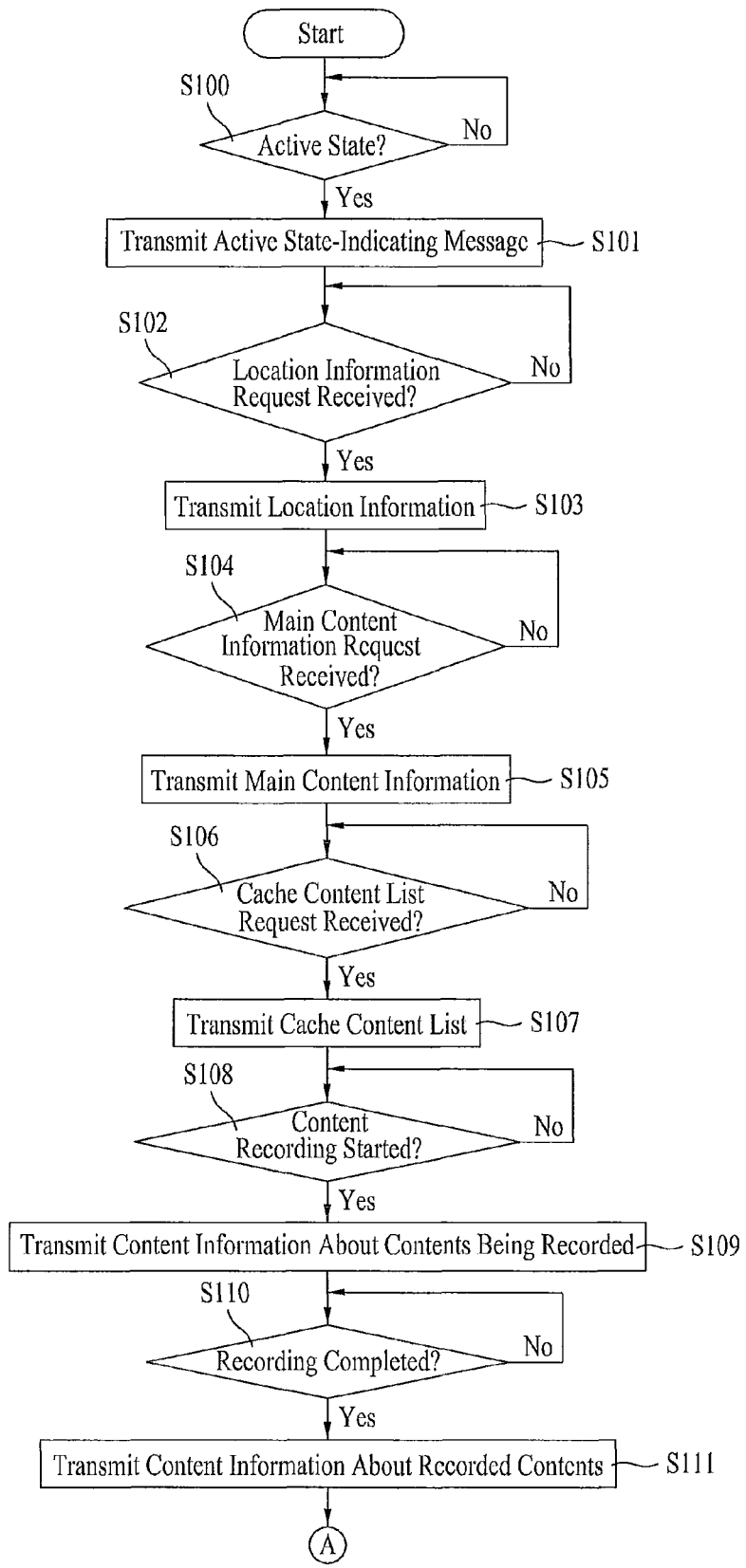
FIGS. 15A and 15B are flowcharts illustrating a content information management method according to an exemplary embodiment of the present invention.
Figure 15B:
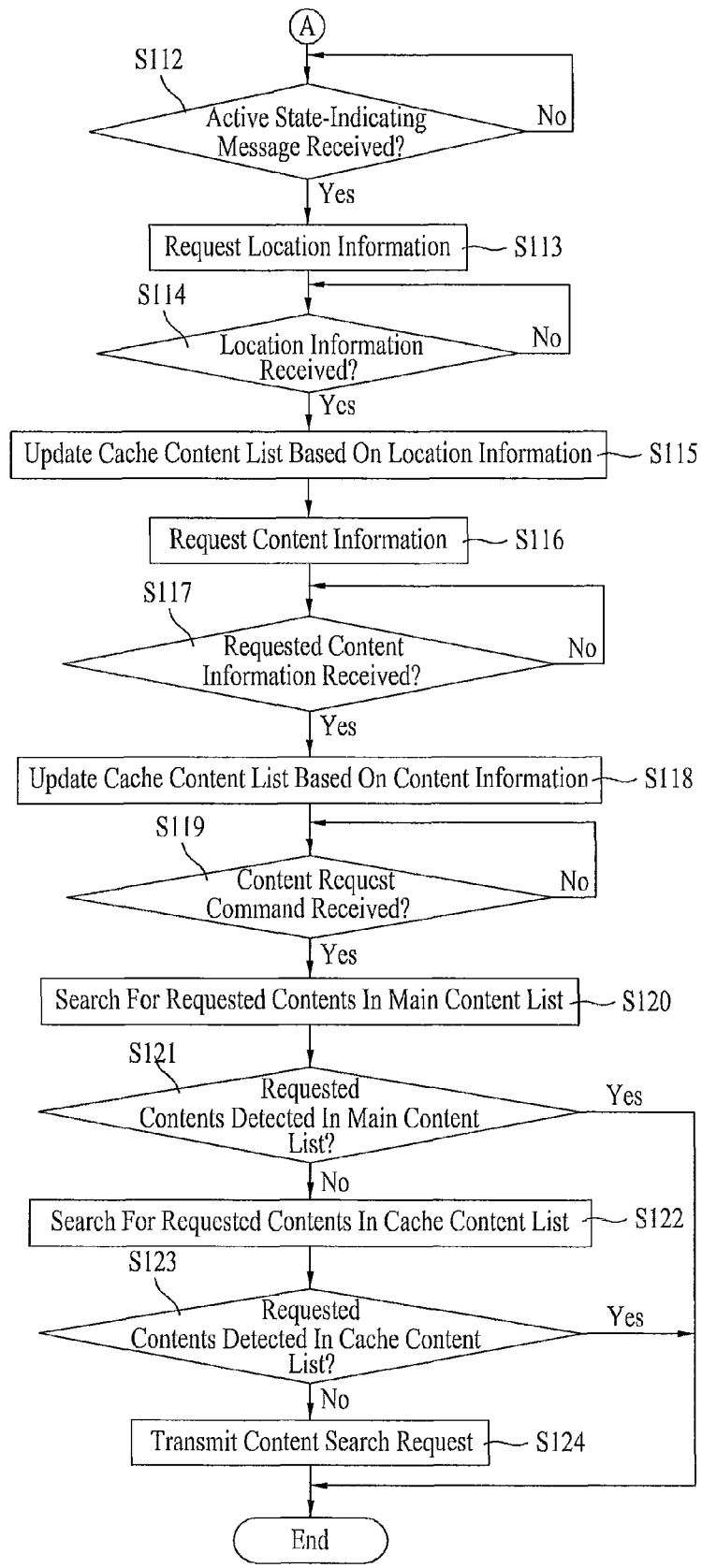

FIGS. 15A and 15B are flowcharts illustrating a content information management method according to an exemplary embodiment of the present invention.

Referring to FIGS. 15A and 15B, the recording/playing controller 507 determines whether an active state has been set in step S100.

In the case of the active state, the recording/playing controller 507 transmits a message indicating the active state to the external resource 101 in step S101. The message indicating the active state may be broadcast. The recording/playing controller 507 determines whether a location information request has been received from the external resource 101 in response to the transmitted message in step S102.

Upon receipt of the location information request, the recording/playing controller 507 transmits location information to the external resource 101 in step S103. In step S104, the recording/playing controller 507 determines whether a main content information request has been received from the external resource 101 in response to the transmitted location information.

Upon receipt of the main content information request, the recording/playing controller 507 transmits main content information to the external resource 1091 in step S105. The main content information refers to content information about existing recorded contents, and the location information includes at least one of an address, a shared folder name, a URL, and a URI of the recording/playing device 100.

The recording/playing controller 507 determines whether a cache content list request has been received in step S106. Upon receipt of the cache content list request, the recording/playing controller 507 transmits a cache content list to the external resource 101 in step S107. The cache content list contains location information and content information associated with the location information, received from other external resources.

In step S108, the recording/playing controller 507 determines whether contents are under recording.

When the content recording starts, the recording/playing controller 507 transmits content information about the contents being recorded to the external resource 101 in step S109. In step S110, the recording/playing controller 507 determines whether the contents have been completely recorded. Along with the progress of the recording, the recording/playing controller 507 may transmit updated content information periodically to the external resource 101.

Upon completion of the content recording, the recording/playing device 507 transmits content information about the recorded contents to the external resource 101 in step S111.

In step S112, the recording/playing controller 507 determines whether a message indicating an active state has been received from the external resource 101. Upon receipt of the active state-indicating message, the recording/playing controller 507 replies to the external resource 101 with a location information request in step S113.

In step S114, the recording/playing controller 507 monitors whether location information has been received in step S114.

Upon receipt of the location information, the recording/playing controller 507 updates its cache content list based on the received location information in step S115. In response to the location information, the recording/playing controller 507 requests content information to the external resource 101 in step S116. In step S117, the recording/playing controller 507 monitors reception of the requested content information.

Upon receipt of the content information, the recording/playing controller 507 updates the cache content list based on the received content information in step S118.

In step S119, the recording/playing controller 507 monitors reception of a content request command.

Upon receipt of the content request command, the recording/playing controller 507 searches a main content list for requested contents in step S120.

If the requested contents are detected in the main content list in step S121, the recording/playing controller 507 may play the requested contents.

If failing to detect the requested contents in the main content list, the recording/playing controller 507 searches the cache content list for requested contents in step S122.

If the requested contents are detected in the cache content list in step S123, the recording/playing controller 507 receives the requested contents from an external resource.

When failing to search for the requested contents in the cache content list, the recording/playing controller 507 transmits a content search request to the external resource 101 in step S124. The content search request includes content identification information about the requested contents. When the recording/playing controller 507 receives location information about an external resource having the requested contents from the external resource 101, it may receive the requested contents from the external resource.

Figure 16:
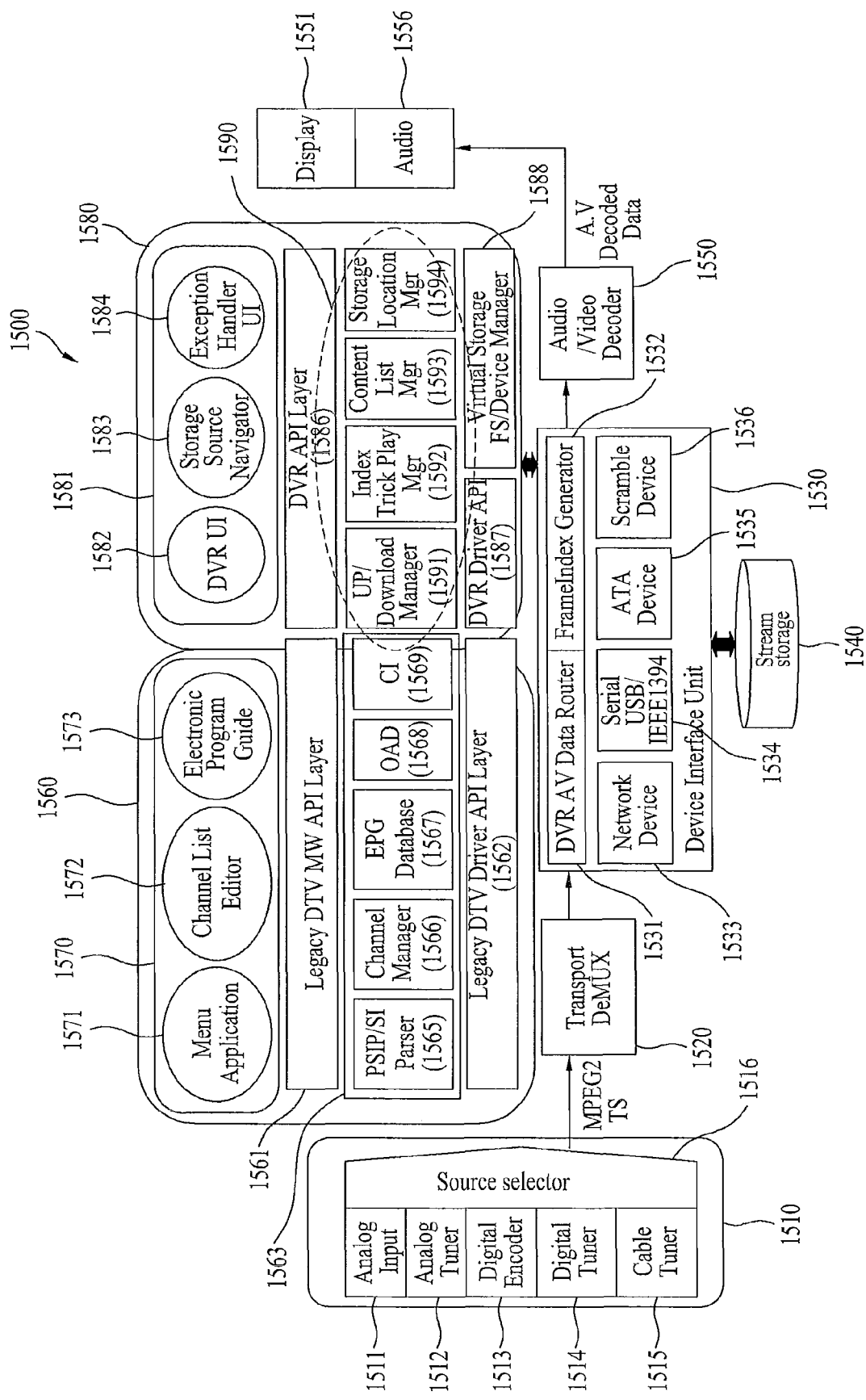
FIG. 16 is a block diagram of the hierarchical structure of the recording/playing device according to an exemplary embodiment of the present invention.

FIG. 16 is a block diagram of the hierarchical structure of the recording/playing device according to an exemplary embodiment of the present invention.

Referring to FIG. 16, a recording/playing device 1500 according to the present invention includes a receiver 1510, a transport DEMUX 1520, a device interface 1530, a stream storage 1540, an audio/video decoder 1550, a processor 1560, and a recording/playing processor 1580.

The receiver 1510 outputs a received external signal to the transport DEMUX 1520. For the signal reception, the receiver 1510 includes an analog receiver 1511, an analog tuner 1512, a digital encoder 1513, a digital tuner 1514, a cable tuner 1515, and a source selector 1516. The receiver 150 is a component corresponding to the receiver 501 of the recording/playing device 100.

For the input of an analog signal, the analog receiver 1511 outputs analog composite, analog RGB, and analog YPbPr data. The digital encoder 1513 encodes the data received from the analog receiver 1511 to an MPEG2 TS.

The analog tuner 1512 tunes a predetermined frequency of an analog broadcasting signal and outputs analog MPEG2 TS data. The digital encoder 1513 encodes the data received from the analog tuner 1512 to an MPEG2 TS.

The digital encoder 1513 converts signals received from the analog receiver 1511 and the analog tuner 1512 to the digital data of MPEG2 TSs.

The digital tuner 1514 tunes a predetermined frequency of a digital broadcasting signal and outputs digital MPEG2 TS data.

The cable tuner 1515 receives an RF signal via a cable and outputs digital MPEG2 TS data.

The source selector 1516 selects one of digitized MPEG2 TSs received from the digital encoder 1513, the digital tuner 1514, and the cable tuner 1515.

The transport DEMUX 1520 demultiplexes the digitized MPEG2 TS received from the source selector 1516. The transport DEMUX 1520 corresponds to the DEMUX 503.

The device interface 1530 outputs the signal received from the transport DEMUX 1520 to the audio/video decoder 1550 or to the stream storage 1540 under the control of DVR middleware 1590, and controls the stream storage 1540. To implement this operation, the device interface 1530 includes a DVR AV data router 1531, a frame index generator 1532, a network device 1533, a serial USB/IEEE1394 1534, an ATA device 1535, and a scramble device 1536.

The DVR AV data router 1531 provides audio and video streams received from the transport DEMUX 1520 to the audio/video decoder 1550 and a data stream received from the transport DEMUX 1520 to middleware 1563 and the DVR middleware 1590. Also, the DVR AV data router 1531 controls the stream storage 1540 to store the audio and video streams from the transport DEMUX 1520, reads audio and video streams from the stream storage 1540, and outputs the read audio and video streams to the audio/video decoder 1550.

The frame index generator 1532 parses a sequence header and a picture header of an audio or video stream and generates location information about frames (I, P and B frames). Also, the frame index generator 1532 outputs the frame location information to an index trick play manager 1592. Then the index trick play manager 1592 generates a time stamp in conjunction with a current system time, the PCR of a TS, and time information of a System Time Clock (STC).

The network device 1533 is responsible for transmitting/receiving data to/from the external resource 101 connected to the network. The recording/playing device 1500 may receive location information and content information from the external resource 101, receive user-requested contents from the external resource, and record contents on the recording medium of the external resource 101, through the network device 1533.

The serial USB/IEEE1394 1534 is used to interface data with an external recording medium or an external network device. The serial USB/IEEE1394 1534 is a serial transmission device supporting USB or IEEE1394. The external recording medium may be a USB memory or a USB HDD, for example, and the external network device may be a USB network, for example.

The ATA device 1535 interfaces data with an internal recording medium. The ATA device 1535 is connected to a Serial ATA (SATA) or Parallel ATA (PATA) HDD and supports data reading and writing from and on the HDD by controlling the HDD.

The scramble device 1536 descrambles an audio or video stream and outputs the descrambled stream to the audio/video decoder 1550.

The stream storage 1540 is used to store audio and video streams and data. The stream storage 1540 may be an external recording medium connected to the serial USB/IEEE1394 1534, an internal recording medium connected to the ATA device 1535, or the recording medium of the external resource 101.

The audio/video decoder 1550 corresponds to the decoder 504. The audio/video decoder 1550 decodes audio and data streams received from the device interface 1530 and outputs the decoded streams to a display 1551 and an audio device 1516, for playing audio and video.

The processor 1560 includes an application 1570, a middleware interface 1561, the middleware 1563, and a driver interface 1562. The processor 1560 corresponds to the controller 506.

The application 1570 serves to provide a broadcasting service to the user by support of the middleware 1563. The application 1570 includes a menu application 1571, a channel list editor 1572, and an EPG 1573.

The middleware interface 1561 interfaces between the application 1570 and the middleware 1563. That is, the middleware interface 1561 transmits information or a command received from the application 1570 to the middleware 1563 and provides the result of the command received from the middleware 1563 to the application 1570.

The middleware 1563 supports the application 1570 and controls resources. The middleware 1563 allocates resources, supports the use of the resources, and releases the resources for the application 1570, such that the application 1570 accesses indirect resources. Therefore, the independency of resources and compatibility of the application 1570 are enhanced.

The middleware 1563 includes a Program and System Information Protocol (PSIP)/System Information (SI) parser 1565 for parsing a data stream included in a TS, a channel manager 1566 for controlling the receiver, an EPG database 1567 for managing EPG-related information, an On Air Download (OAD) 1568 for downloading software and updating an application based on the downloaded software, and a CI 1569 for controlling the scramble device 1530 to decode coded audio and video streams.

The driver interface 1562 interfaces between the middleware 1563 and hardware resources. The middleware 1563 controls the receiver 1516, the transport DEMUX 1520, the device interface 1533, and the audio/video decoder 1550.

The recording/playing processor 1580 includes a recording/playing application 1581, a DVR middleware interface 1586, the DVR middleware 1590, a DVR driver interface 1587, and a virtual storage/File System (FS)/device connection manager 1588. The recording/playing processor 1580 corresponds to the recording/playing controller 507. As stated before, when the controller 506 incorporates the functions of the recording/playing controller 507, the recording/playing processor 1580 is a component corresponding to the controller 506.

The recording/playing application 1581 includes a DVR User Interface (UI) 1582, a storage source navigator 1583, and an exception handler UI 1584. The DVR user interface 1582 performs DVR-related user interfacing. The storage source navigator 1583 provides the user with information about contents stored in the stream storage 1540, allows the user to select contents, and searches for user-intended contents. The exception handler UI 1584 notifies the user of errors in connection to the external resource or the stream storage 1540 or errors in a DVR operation, and supports the user's handling of the errors.

The DVR middleware interface 1586 is similar to the middleware interface 1561 in operation. The DVR middleware interface 1586 interfaces between the recording/playing application 1581 and the DVR middleware 1590.

The DVR middleware 1590 is similar to the middleware 1563 in operation, supporting DVR operations. To support the DVR operations, the DVR middleware 1590 includes an upload/download manager 1591, the index trick play manager 1592, a content list manager 1593, and a storage location manager 1594.

The upload/download manager 1591 determines the transmission direction of data based on a time stamp generated by the frame index generator 1532 and accordingly controls the DVR AV data router 1581.

The index trick play manager 1592 constructs a database with time stamps and indexes generated from the frame index generator 1532 and changes the location of played contents, for video trick play, so that a user-intended trick play is performed.

The content list manager 1593 manages the stream storage 1540 as a virtual storage such that it appears like an internal recording medium to the application 1581, the upload/download manager 1591, and the index trick play manager 1592, and also manages a content list.

The storage location manager 1594 controls and manages the physical connection relationship of each component of the device interface 1530.

The DVR drive interface 1587 interfaces between the device interface 1530 and the DVR middleware 1590 and provides a function provided by the device interface 1530 to the DVR middleware 1590 by Application Program Interfacing (API).

The virtual storage/FS/device connection manager 1588 integratedly virtualizes the physical/logical connection relationship between each of the network device 1533, the serial USB/IEEE1394 1534, and the ATA device 1535 and their connected stream storage 1540 and indicates the virtualized connection relationships to the DVR middleware 1590. That is, the virtual storage/FS/device connection manager 1588 manages the physical/logical connection relationships of the stream storage 1540 such that the DVR middleware 1590 accesses contents with different input sources, integratedly.

As is apparent from the above description, the recording/playing device, the server for managing content location information, the information recording medium, and the method for managing content information according to exemplary embodiments of the present invention enable recording of contents on recording media distributed across a network and sharing of contents stored in the recording media. Therefore, each recording/playing device or broadcasting receiver records or plays broadcast contents without using a separately procured recording medium, plays contents that are not recorded by the recording/playing device or broadcasting receiver, and has no need for using a large-capacity storage for storing a large amount of recorded contents.

Since information about the contents stored in the recording media distributed across the network is acquired, information about user-requested contents is detected from the acquired information, and thus the requested contents are provided to a user, the user can easily play and view the contents that he has not recorded.

The easy acquisition of the information about the contents stored in the recording media distributed across the network and updating of the stored contents to the latest ones enable the user to search for contents being recorded by another recording/playing device and play and view the contents.

When each of the recording media distributed across the network has only part of entire contents recorded therein, the content segments are searched for in the recording media and combined into the entire contents, for playing. Hence, even though a recording/playing device records contents partially, it can play the contents by receiving the other content segments from other recording/playing devices.

As time shifting is efficiently performed based on the contents stored in the recording media distributed across the network, the user can view a past version of broadcasting of a new channel even though he changes from an old channel to the new channel.

The present invention can be realized as a computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording/playing device comprising:
a communication interface unit configured to interface with a plurality of digital devices connected to the recording/playing device through a local area network (LAN);
a user interface configured to receive a request for a content from a user;
a storage configured to store a content list; and
a controller configured to: search for a recording in response to the received request,
receive the recording from the at least one of the plurality of digital devices through the LAN but not through an external network connected to the LAN,
when there is a time shift request by the user of the recording/playing device or a user of the at least one of the plurality of digital devices to reproduce content that was previously reproduced, search for the time shift requested content from the recording/playing device and the at least one of the plurality of digital devices having the time shift requested content based on the content list,
control the time shift requested content to be transmitted between the recording/playing device and the at least one of the plurality of digital devices through the LAN but not through the external network, and
reproduce the time shift requested content received from the recording/playing device and the at least one of the plurality of digital devices having the time shift requested content.

2. The recording/playing device according to claim 1, wherein when a transport ID, a service ID, and an event ID of the requested content are identical to a transport ID, a service ID, and an event ID of a content recorded in the at least one of the plurality of digital devices, the controller determines the at least one of the plurality of digital devices as a digital device recording the requested content.

3. The recording/playing device according to claim 1, further comprising:
   a time shift recording region configured to store the time shift requested content,
   wherein currently received contents are stored by deleting data of the time shift recording region in a first-input first-deleted method, or overwriting new data on existing data in the time shift recording region.

4. The recording/playing device according to claim 1, wherein the controller receives content segments from the at least one of the plurality of digital devices, the content segments being parts of the content, and reproduces the requested content by reproducing the received content segments.

5. The recording/playing device according to claim 4, wherein the controller receives clock information used for a coding scheme from each of the searched at least one of the plurality of digital devices, and generates the requested content by combining the content segments based on the clock information.

6. The recording/playing device according to claim 5, wherein the clock information is a Program Clock Reference (PCR).

7. The recording/playing device according to claim 4, wherein the controller calculates clock information used for coding schemes based on recording time information about the content segments and requests the content segments to the searched at least one of the plurality of digital devices by including the calculated clock information in the request.

8. The recording/playing device according to claim 1, wherein the controller displays a progress bar indicating time shift information regarding the time shift requested content.

9. The recording/playing device according to claim 1, wherein the controller generates at least one thumbnail image indicating a time point or any other image after the time point and the controller displays the at least one thumbnail image.

10. The recording/playing device according to claim 1, wherein the controller includes content information in the content list, the content information including content identification information about contents recorded in the at least one of the plurality of digital devices indicated by the location information.

11. The recording/playing device according to claim 10, wherein the controller searches for the at least one of the plurality of digital devices recording the requested content in the content list by comparing the content identification information included in the content list with the content identification information about the requested content and controls to receive the requested content from the searched at least one of the plurality of digital devices.

12. The recording/playing device according to claim 10, wherein the content information further includes content recording time information.

13. The recording/playing device according to claim 12, wherein the content recording time information includes recording start time information indicating a recording start time of content identified by the content identification information included in the content information and recording end time information indicating a recording end time of the identified content.

14. The recording/playing device of claim 1, wherein the controller transmits location information about the recording/playing device or the content list to at least one of the plurality of digital devices.

15. The recording/playing device of claim 1, wherein the controller broadcasts a message indicating an active state of the recording/playing device, or controls to unicast the message indicating an active state of the recording/playing device to the at least one of the plurality of digital devices indicated by the location information.

16. The recording/playing device of claim 1, wherein the at least one of the plurality of digital devices includes at least one of a recording/playing device, a digital device with a recording medium, and a content locater management server.

17. A method of sharing time shift content with at least one of a plurality of digital devices connected to a recording/playing device through a local area network (LAN), the recording/playing device including a communication interface unit configured to interface with the plurality of digital devices, the method comprising:
   receiving, by a user interface included in the recording/playing device, a request for a content from a user;
   storing, by a storage included in the recording/playing device, a content list;
   searching, by a controller included in the recording/playing device, for a recording in response to the received request;
   receiving, by the controller, the recording from the at least one of the plurality of digital devices through the LAN but not through an external network connected to the LAN;
   when there is a time shift request by the user of the recording/playing device or a user of the at least one of the plurality of digital devices to reproduce content that was previously reproduced, searching, by the controller, for the time shift requested content from the recording/playing device and the at least one of the plurality of digital devices having the time shift requested content based on the content list;
   transmitting the time shift requested content between the recording/playing device and the at least one of the plurality of digital devices through the LAN but not through the external network; and
   reproducing, by the controller, the time shift requested content received from the recording/playing device and the at least one of the plurality of digital devices having the time shift requested content.

* * * * *